United States Patent
Xu et al.

(10) Patent No.: US 10,875,025 B2
(45) Date of Patent: Dec. 29, 2020

(54) STORAGE APPARATUS AND PROTECTIVE COVER DEVICE THEREOF

(71) Applicant: HealthBanks Biotech Co., Ltd., Taipei (TW)

(72) Inventors: Xiang-Rui Xu, Taipei (TW); Ti-Chieh Wu, New Taipei (TW); Shang-Chih Lin, New Taipei (TW); Pei-Chi Tseng, Taipei (TW); Wei-Yu Lo, Taipei (TW)

(73) Assignee: HEALTHBANKS BIOTECH CO., LTD., Taipei (TW)

( * ) Notice: Subject to any disclaimer, the term of this patent is extended or adjusted under 35 U.S.C. 154(b) by 398 days.

(21) Appl. No.: 15/203,374

(22) Filed: Jul. 6, 2016

(65) Prior Publication Data
US 2017/0252745 A1    Sep. 7, 2017

(30) Foreign Application Priority Data
Mar. 4, 2016  (TW) .............................. 105106624 A

(51) Int. Cl.
*B01L 9/00* (2006.01)
*B01L 3/00* (2006.01)
*A01N 1/02* (2006.01)

(52) U.S. Cl.
CPC ............ *B01L 3/523* (2013.01); *A01N 1/0263* (2013.01); *B01L 9/52* (2013.01); *B01L 2200/025* (2013.01); *B01L 2300/04* (2013.01)

(58) Field of Classification Search
CPC .................................... B01L 9/52; B01L 9/00
USPC ......................................... 422/561, 560, 548
See application file for complete search history.

(56) References Cited

U.S. PATENT DOCUMENTS

| | | |
|---|---|---|
| 7,748,545 B2 | 7/2010 | Johnson |
| 2003/0015486 A1 | 1/2003 | Chen |
| 2004/0084393 A1 | 5/2004 | Varga |
| 2010/0253190 A1* | 10/2010 | Li .......................... A01N 1/0242 |

\* cited by examiner

*Primary Examiner* — Natalia Levkovich
(74) *Attorney, Agent, or Firm* — Hamre, Schumann, Mueller & Larson, P.C.

(57) ABSTRACT

A storage apparatus includes a storage device having a first storage assembly with a plurality of first storage racks and a second storage assembly with a plurality of second storage racks surrounding the first storage racks. At least one of the first and second storage assemblies includes a removable carrier rack configured to align with a selected storage rack of the other first or second storage assembly. A protective cover device includes first and second protective cover assemblies respective disposed on top ends of the first and second storage assemblies. At least one of the first and second protective cover assemblies is openable at an area corresponding to the top of the carrier rack to permit removal of the same.

38 Claims, 32 Drawing Sheets

STORAGE APPARATUS AND PROTECTIVE COVER DEVICE THEREOF

CROSS REFERENCE TO RELATED APPLICATION

This application claims priority of Taiwanese Patent Application No. 105106624, filed on Mar. 4, 2016.

FIELD

The disclosure relates to a storage apparatus, more particularly to a storage apparatus that can permit individual storage and removal of a sample therefrom and a protective cover device thereof.

BACKGROUND

Existing method of storing biological samples of, for example, umbilical cord blood, bone marrow, placenta, embryos, sperms, eggs, etc., is very diversified. For long-term preservation of the biological samples, the samples are mainly stored in a cryogenic environment (such as liquid nitrogen at −196° C.) of an ultra-low temperature storage apparatus to maintain the biological activity of the cells.

The ultra-low temperature storage apparatus currently used in the market is a traditional storage apparatus, such as Taylor-Wharton and MVE. The traditional storage apparatus includes a liquid nitrogen storage barrel. The storage barrel includes a barrel body and a cover body openably covering a top end of the barrel body. A plurality of storage racks are provided inside the barrel body for storage of biological samples. When a user desires to store or remove a specific biological sample, the cover body must first be opened to take out one of the storage racks from the storage barrel. After the specific biological sample is stored or removed, the one of the storage racks is then placed back inside the storage barrel. A large temperature change occurs when the one of the storage racks is moved from the low-temperature environment of the storage barrel to the room temperature, so that the other biological samples stored in the same storage rack are affected by the transient warming events, causing damage to the biological cells and reduction of the biological activity thereof.

Moreover, when the cover body is opened, liquid nitrogen inside the storage barrel will rapidly volatilize and generate fog that reduces visibility, and boiling and splashing thereof may injure the user. In addition, when the volatilized liquid nitrogen is in contact with ambient air, steam at an opening area of the barrel body will condense, and when the condensed water drops inside the barrel body, it is solidified into ice particles that are accumulated at a bottom portion of the barrel body. The accumulation of the ice particles at the bottom portion of the barrel body will hinder the placement of the storage racks inside the barrel body. Thus, the user must periodically remove all the storage racks and all the biological samples to clear the accumulated ice inside the barrel body. However, the effect of transient warming events during the removal of the biological samples from the barrel body causes damage to the biological cells and reduction of the biological activity thereof.

SUMMARY

Therefore, an object of the present disclosure is to provide a storage apparatus that can alleviate at least one of the drawbacks of the prior art.

Another object of this disclosure is to provide a storage apparatus that can easily, quickly and accurately align a carrier rack and a storage rack to thereby enhance speed and efficiency of a storage box during storage and retrieval.

According to one aspect of this disclosure, a storage apparatus comprises a storage device and a protective cover device. The storage device includes first and second storage assemblies. The first storage assembly has a plurality of first storage racks arranged in a ring shape. The second storage assembly has a plurality of second storage racks surrounding the first storage racks. One of the first and second storage assemblies is rotatable relative to the other. At least one of the first and second storage assemblies includes a removable carrier rack. The carrier rack is configured to align with a selected one of the storage racks of the other one of the first and second storage assemblies.

The protective cover device covers the storage device and includes a first protective cover assembly disposed on a top end of the first storage assembly, and a second protective cover assembly disposed on a top end of the second storage assembly and surrounding the first protective cover assembly. At least one of the first and second protective cover assemblies is openable at an area corresponding to the top of the carrier rack to permit removal of the same.

Still another object of this disclosure is to provide a protective cover device for the aforesaid storage apparatus.

According to another aspect of this disclosure, a protective cover device for covering a storage device of a storage apparatus comprises a first protective cover assembly and a second protective cover assembly surrounding the first protective cover assembly. At least one of the first and second protective cover assemblies is openable at an area corresponding to the top of a carrier rack of the storage device for removal of the carrier rack through the protective cover device.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
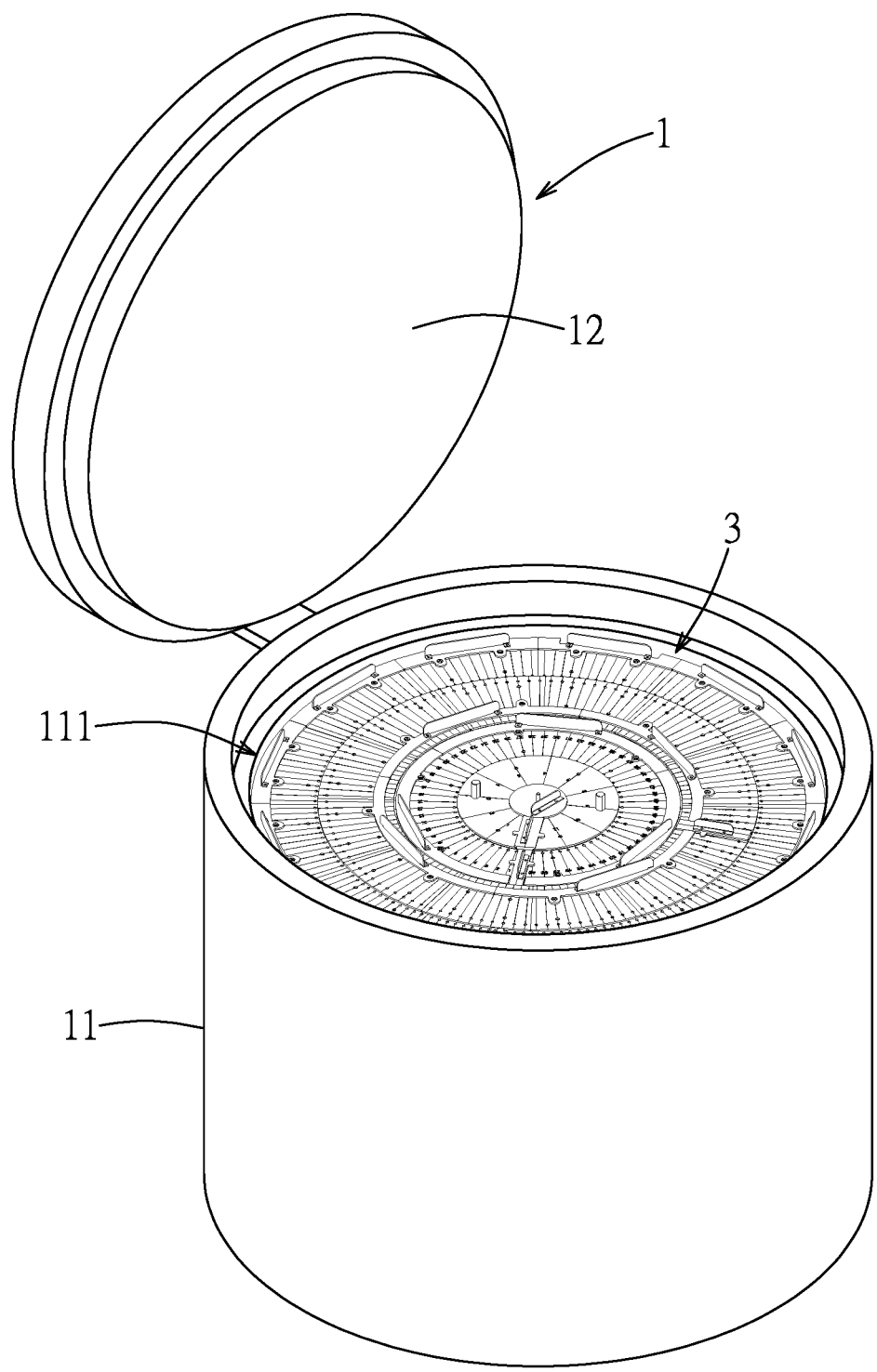
FIG. 1 is a perspective view of a storage apparatus according to the embodiment of the present disclosure.

Referring to FIGS. 1 to 4, a storage apparatus 100 according to the embodiment of the present disclosure is shown to comprise a storage barrel 1, a storage device 2 and a protective cover device 3.

The storage barrel 1 includes a barrel body 11 and a cover body 12 for openably covering a top end of the barrel body 11. The barrel body 11 is formed with a storage reservoir 111. The storage reservoir 111 is filled with liquid (not shown), such as liquid nitrogen.

The storage device 2 is disposed in the storage reservoir 111, and includes a first storage assembly 21 and a second storage assembly 24. The first storage assembly 21 includes a plurality of first storage racks 210 arranged in a ring shape. The second storage assembly 24 includes a plurality of second storage racks 240 surrounding the first storage racks 210. Each of the first and second storage racks 210, 240 is configured for storing a plurality of samples (not shown). The sample is exemplified in this embodiment as a biological sample of an umbilical cord blood. One of the first and second storage assemblies 21, 24 is rotatable relative to the other. At least one of the first and second storage assemblies 21, 24 includes a removable carrier rack for alignment with a selected one of the storage racks of the other one of the first and second storage assemblies 21, 24 for conducting storage and removal of the sample.

The protective cover device 3 is disposed in the storage reservoir 111 and covers the storage device 2. The protective cover device 3 includes a first protective cover assembly 31 disposed on a top end of the first storage assembly 21, and a second protective cover assembly 33 disposed on a top end of the second storage assembly 24 and surrounding the first protective cover assembly 31. At least one of the first and second protective cover assemblies 31, 33 is openable at an area corresponding to the top of the carrier rack. When the first or second protective cover assembly 31, 33 is opened at the area corresponding to the top of the carrier rack, storage or removal of the sample can be conducted through the carrier rack and the aligned storage rack. Further, the carrier rack can be taken out of the storage reservoir 111 through the protective cover device 3 to facilitate storage of the sample into or removal of the sample from the carrier rack.

Through the design of the removable carrier rack, there is no need to remove the storage rack from the storage reservoir 111 to conduct storage and removal of the sample, so that the other samples stored in the storage rack can be prevented from being affected by the transient warming events which may lead to the damage of the biological cells and reduction of the biological activity thereof. Moreover, the protective cover device 3 can prevent the liquid nitrogen in the storage reservoir 111 from rapid volatilization and generation of fog that reduces visibility. In addition, the volatilized liquid nitrogen can also be prevented from causing water in the air to condense and then solidify into ice particles that drop inside the storage reservoir 111. Hence, accumulation of ice particles inside the storage barrel 1 can be prevented, so that safe use of the disclosure can be enhanced.

A detailed description of the specific structure of the storage apparatus 100 is given below.

Figure 3:
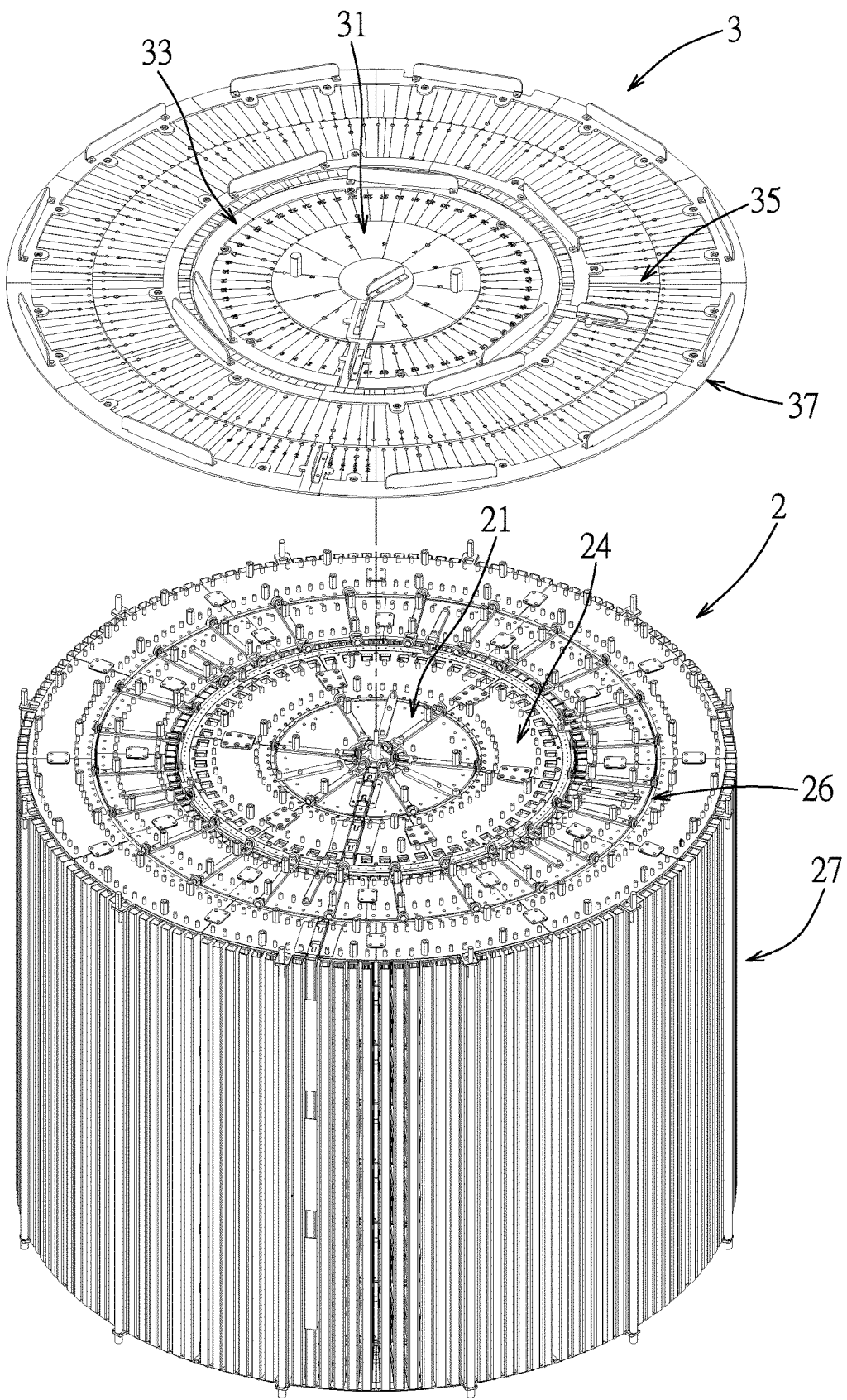
FIG. 3 is an exploded perspective view of the storage device and the protective cover device of FIG. 2.
Figure 4:
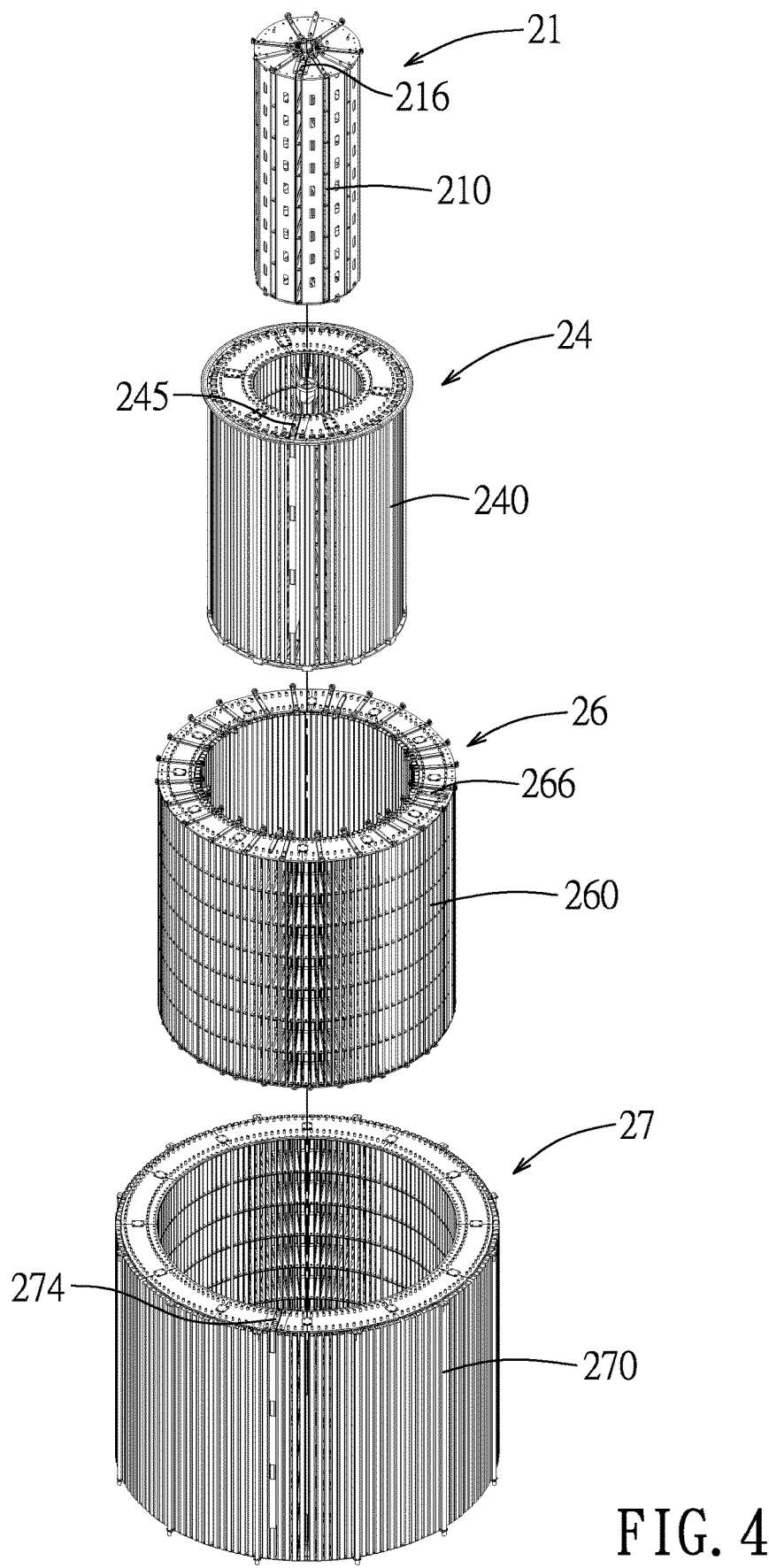
FIG. 4 is an exploded perspective view of the storage device of the embodiment.

With reference to FIGS. 3 and 4, the storage device 2 of this embodiment further includes a third storage assembly 26 and a fourth storage assembly 27, and the protective cover device 3 further includes a third protective cover assembly 35 and a fourth protective cover assembly 37. The third storage assembly 26 includes a plurality of third storage racks 260 surrounding the second storage racks 240. The fourth storage assembly 27 includes a plurality of fourth storage racks 270 surrounding the third storage racks 260. Each of the third and fourth storage assemblies 26, 27 is configured for storing a plurality of samples (not shown). One of the third and fourth storage assemblies 26, 27 is rotatable relative to the other. At least one of the third and fourth storage assemblies 26, 27 includes another removable carrier rack configured to align with a selected one of the storage racks of the other one of the third and fourth storage assemblies 26, 27 for conducting storage or removal of the sample. The third protective cover assembly 35 is disposed on a top end of the third storage assembly 26 and surrounds the second protective cover assembly 33. The fourth protective cover assembly 37 is disposed on a top end of the fourth storage assembly 27 and surrounds the third protective cover assembly 35. At least one of the third and fourth protective cover assemblies 35, 37 is openable at an area corresponding to the top of the another carrier rack, so that the another carrier rack can be taken out through the protective cover device 3. When the third or fourth protective cover assembly 35, 37 is opened at the area corresponding to the top of the another carrier rack, storage or removal of the sample can be conducted through the another carrier rack and the aligned storage rack.

Figure 5:
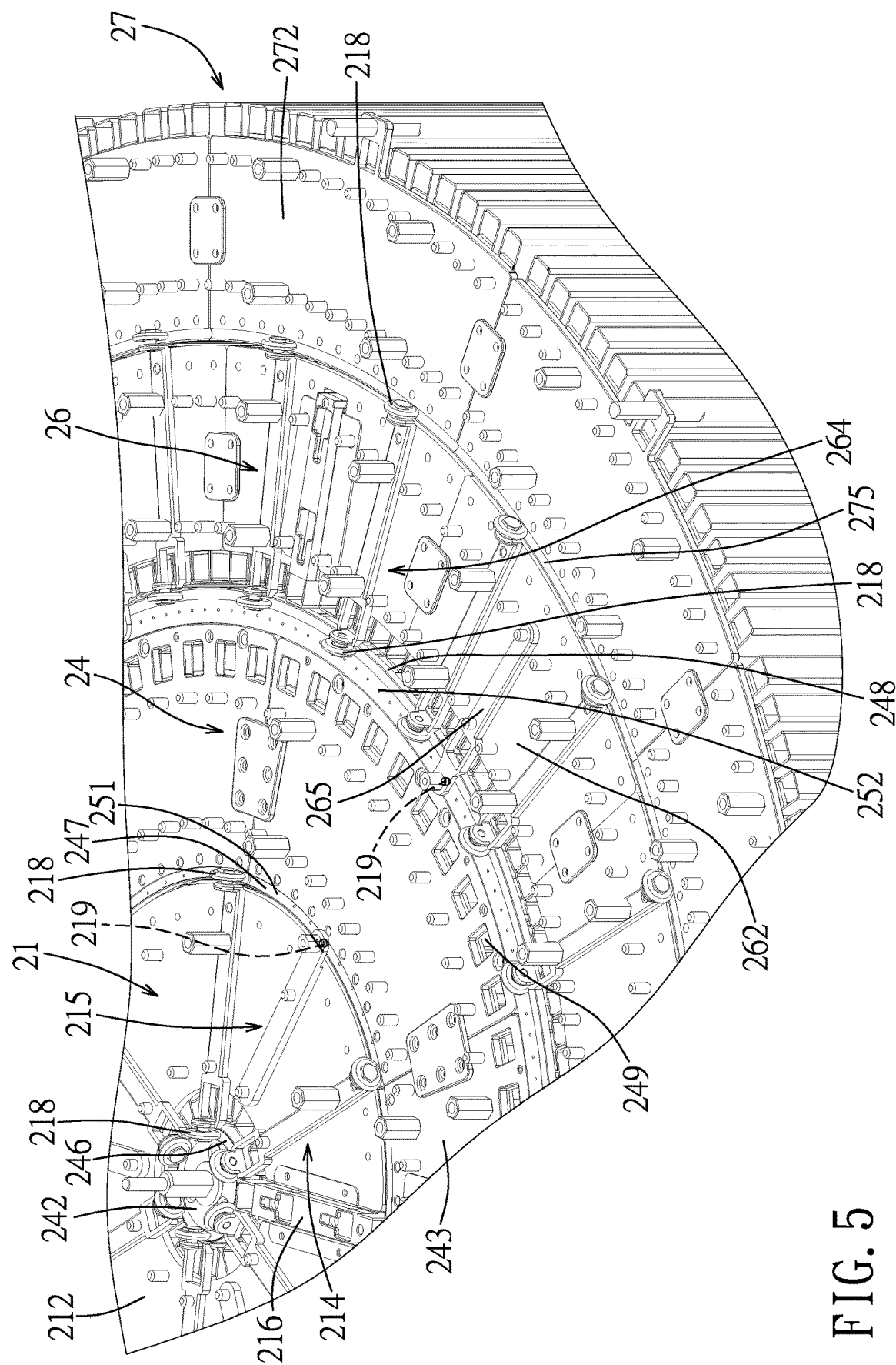
FIG. 5 is an enlarged fragmentary perspective view of the storage device of the embodiment.
Figure 6:
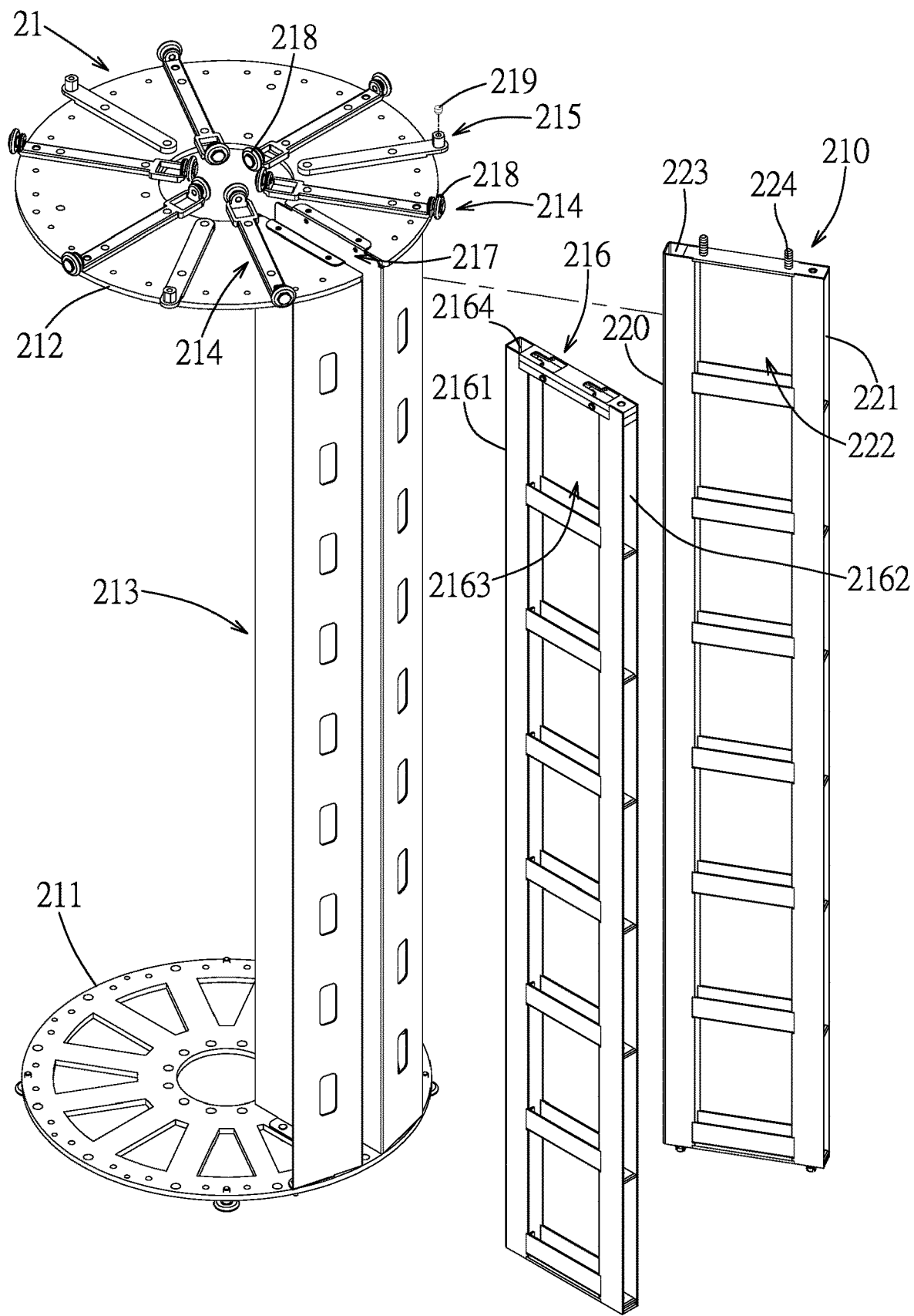
FIG. 6 is a partly exploded perspective view of a first storage assembly of the embodiment.

Referring to FIGS. 5 and 6, in combination with FIG. 4, the first storage assembly 21 includes a bottom plate 211, a top plate 212, a first guide member 213, a plurality of suspension units 214 disposed on a top end of the top plate 212 and arranged in a ring shape, a plurality of positioning units 215 disposed on the top end of the top plate 212 and arranged in a ring shape, and a first carrier rack 216. Each of the bottom and top plates 211, 212 has a circular ring shape. In this embodiment, the number of the first storage racks 210 is eleven (11). Each first storage rack 210 is disposed between the bottom and top plates 211, 212. The first guide member 213 is disposed between the bottom and top plates 211, 212, and cooperates with the bottom plate 211 to define a first insertion slot 217 having an upward opening for insertion of the first carrier rack 216 therein. Through the guidance of the first guide member 213, the first carrier rack 216 can be accurately inserted into the first insertion slot 217. Each suspension unit 214 is located above a corresponding one of the first storage racks 210, and includes two rollers 218 respectively located at inner and outer sides of the top plate 212. Each positioning unit 215 is located between two adjacent ones of the suspension units 214 and above a corresponding first storage rack 210, and includes a positioning member 219 located at the outer side of the top plate 212.

The first storage racks 210 cooperate with the first carrier rack 216 to form a loop. Each first storage rack 210 has a structure similar to that of the first carrier rack 216, that is, an elongated upright shape. Each of the first storage rack 210 and the first carrier rack 216 has a closed side 220, 2161 facing inward, and an open side 221, 2162 opposite to the closed side 220, 2161 and facing outward. Each of the first storage rack 210 and the first carrier rack 216 is formed with a plurality of receiving grooves 222, 2163 spaced apart from each other along the length thereof, and a communication groove 223, 2164 communicating with the receiving grooves 222, 2163 and having an upward opening. Each receiving groove 222, 2163 is located between the closed and open sides 220, 2161, 221, 2162. In this embodiment, the number of the receiving groove 222, 2163 is seven (7), and the receiving grooves 222, 2163 are numbered 1 to 7 from top to bottom. Each receiving groove 222, 2163 communicates with the communication groove 223, 2164 at a side which is proximate to the closed side 220, 2161, and communicates with the ambience at a side which is proximate to the open side 221, 2162. Through this, each sample can be stored in or removed from a corresponding one of the receiving grooves 222, 2163 through the open side 221, 2162. The communication groove 223, 2164 of each of the first storage rack 210 and the first carrier rack 216 is located at an inner side of the top plate 212 and is not covered by the same.

Each first storage rack 210 includes two threaded bolts 224 disposed at a top end thereof. The threaded bolts 224 extend through the top plate 212 and the corresponding suspension unit 214, and protrude out of a top end of the corresponding suspension unit 214.

Figure 7:
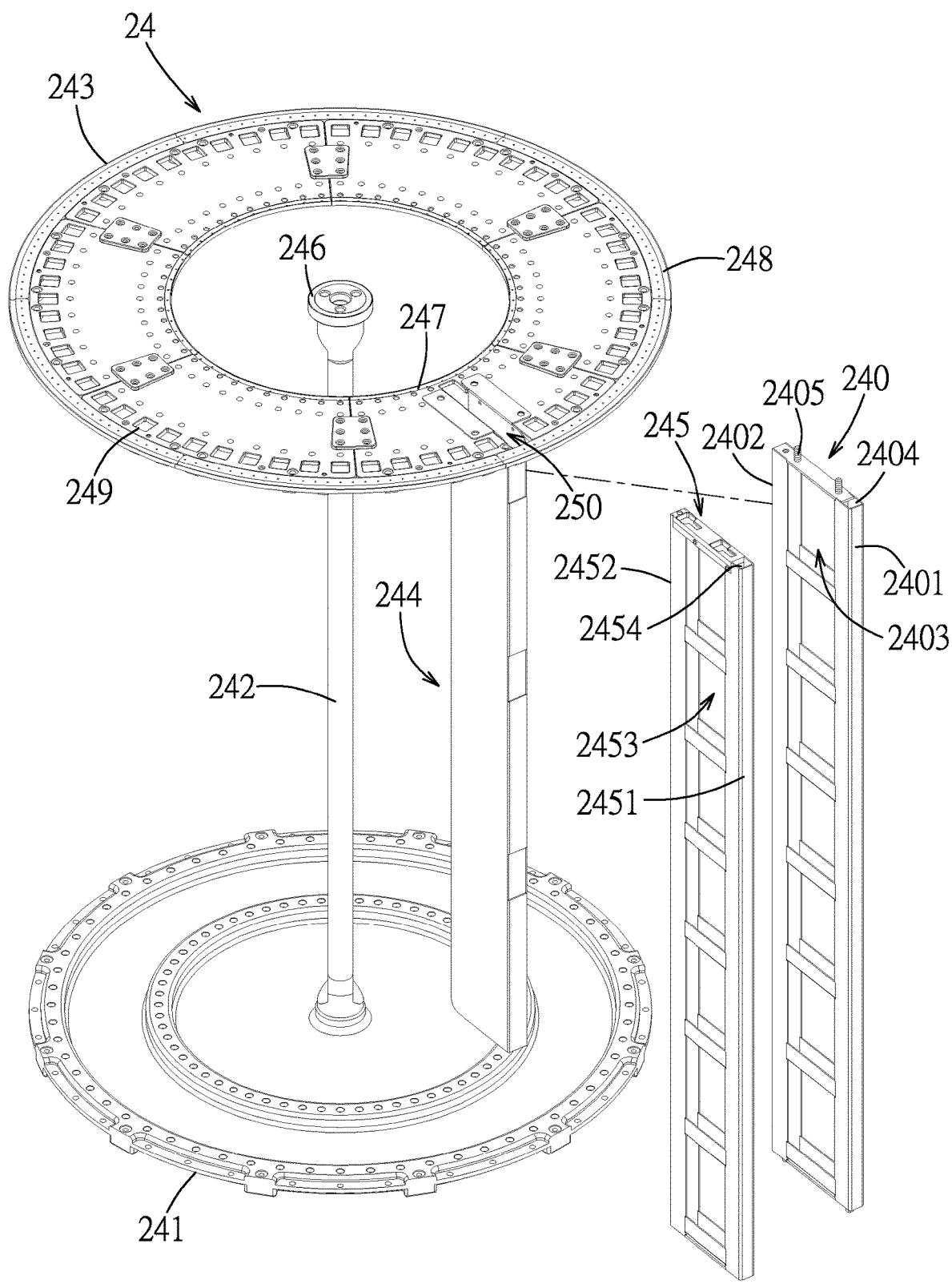
FIG. 7 is a partly exploded perspective view of a second storage assembly of the embodiment.

Referring to FIG. 7, in combination with FIGS. 4 and 5, the second storage assembly 24 includes a bottom plate 241, a central axle 242 disposed on the center of the bottom plate 241, a top plate 243, a second guide member 244, and a second carrier rack 245. The top plate 243 has a circular ring shape and is coplanar with the top plate 212 of the first storage assembly 21. The central axle 242 has a top surface located at the center of the top plate 243 and formed with a circular first guide groove 246. The top plate 243 has a top surface formed with a circular second guide groove 247 proximate to an inner periphery thereof and a circular third guide groove 248 proximate to an outer periphery thereof. The top plate 243 is further formed with a plurality of annularly spaced-apart through holes 249 proximate to the third guide groove 248. The second guide member 244 is disposed between the bottom and top plates 241, 243, and defines a second insertion slot 250 having an upward opening for insertion of the second carrier rack 245t therein. Through the guidance of the second guide member 244, the second carrier rack 245 can be accurately inserted into the second insertion slot 250.

In this embodiment, the number of the second storage rack 240 is fifty nine (59). The second storage racks 240 cooperate with the second carrier rack 245 to form a loop. Each second storage rack 240 is disposed between the bottom and top plates 241, 243, and has a structure similar to that of the first storage rack 210. The open side 2402 of each second storage rack 240 faces inward, while the closed side 2401 thereof faces outward. The communication groove 2404 of each second storage rack 240 is aligned with a corresponding one of the through holes 249. The two threaded bolts 2405 of each second storage rack 240 extend through the top plate 243 and protrude out of a top end of the top plate 243. The second carrier rack 245 is removably inserted into the second insertion slot 250, and has a structure similar to that of the first carrier rack 216. The open side 2452 of the second carrier rack 245 faces inward, while the closed side 2451 thereof faces outward.

The first storage assembly 21 is inserted into the central axle 242 of the second storage assembly 24. The two rollers 218 of each suspension unit 214 are respectively received in and are respectively rollable along the first and second guide grooves 246, 247. The first storage assembly 21 is suspended on the second storage assembly 24 through the suspension units 214, and is rotatable relative to the second storage assembly 24 about the central axle 242. Through this, the first carrier rack 216 can be aligned with a selected one of the second storage racks 240, and the second carrier rack 245 can be aligned with a selected one of the first storage racks 210.

Furthermore, as shown in FIG. 5, the top plate 243 of the second storage assembly 24 is formed with a plurality of annularly spaced-apart first positioning grooves 251 and a plurality of annularly spaced-apart second positioning grooves 252. The first positioning grooves 251 communicate with the second guide groove 247. One of the first positioning grooves 251 is aligned with the top of the second carrier rack 245, while the rest of the first positioning grooves 251 are respectively aligned with the tops of the second storage racks 240. The second positioning grooves 252 are located between the through holes 249 and the third guide groove 248. The positioning member 219 of each positioning unit 215 is removably engageable with a corresponding one of the first positioning grooves 251. When the positioning member 219 is rotated to a position aligned with the corresponding first positioning groove 251, the positioning member 219 automatically engages the corresponding first positioning groove 251 through a biasing force of a compression spring (not shown) that biases the positioning member 219 to move downward. With the coordination of each positioning unit 215 and the corresponding first positioning groove 251, the first carrier rack 216 can be positioned aligned with any of the second storage racks 240, and the second carrier rack 245 can be positioned aligned to any of the first storage racks 210. Through this, relative rotation or vibration between the first and second storage assemblies 21, 24 can be prevented during the storage or removal of the sample.

Figure 8:
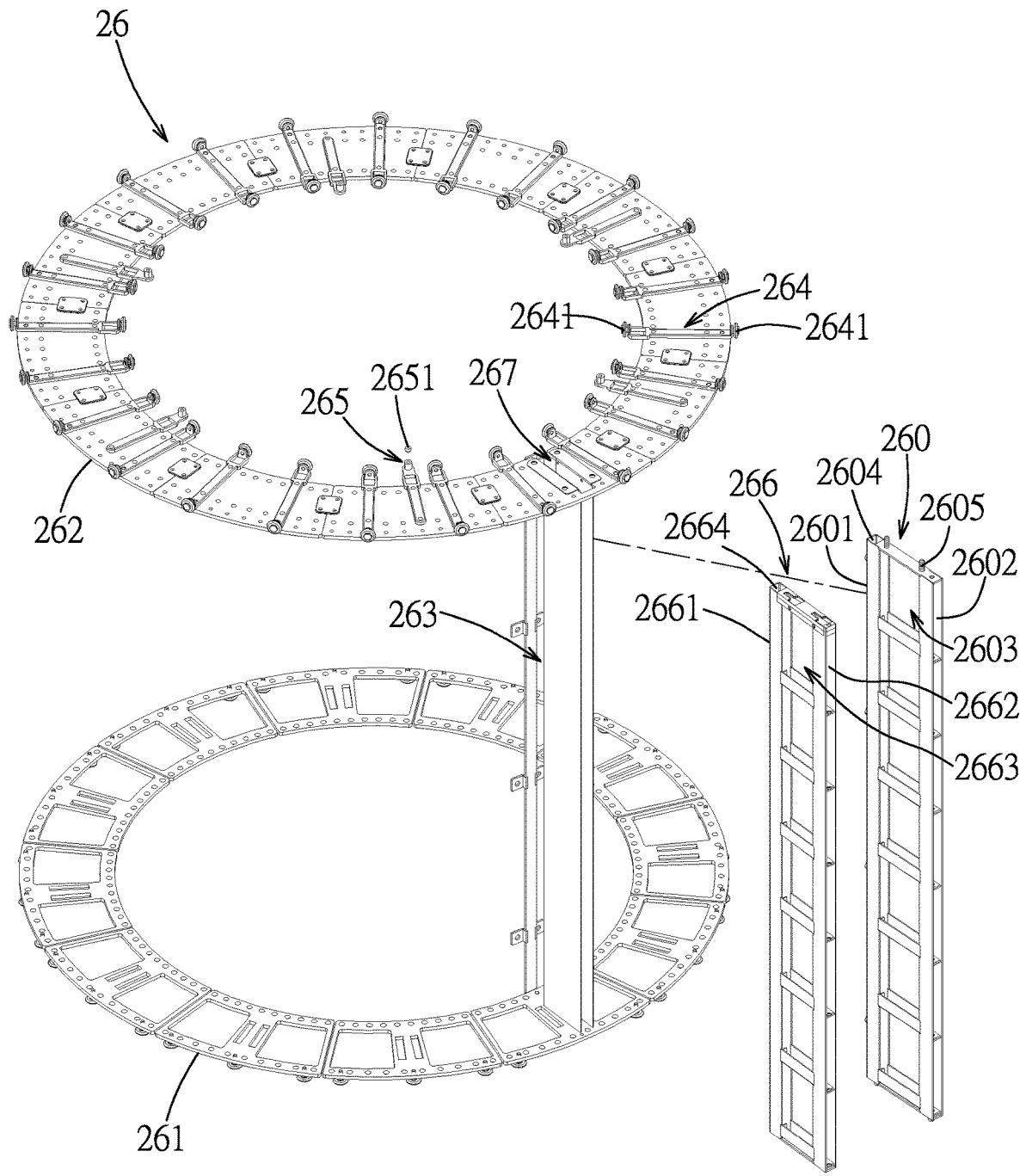
FIG. 8 is a partly exploded perspective view of a third storage assembly of the embodiment.

Referring to FIG. 8, in combination with FIGS. 4 and 5, the third storage assembly 26 is sleeved on the second storage assembly 24, and includes a bottom plate 261, a top plate 262, a third guide member 263, a plurality of suspension units 264 disposed on a top end of the top plate 262 and arranged in a ring shape, a plurality of positioning units 265 disposed on the top end of the top plate 262 and arranged in a ring shape, and a third carrier rack 266. Each of the bottom and top plates 261, 262 has a circular ring shape. The top plate 262 is coplanar with the top plate 243 of the second storage assembly 24. The third guide member 263 is disposed between the bottom and top plates 261, 262, and cooperates with the bottom plate 261 to define a third insertion slot 267 having an upward opening for insertion of the third carrier rack 266 therein. Through the guidance of the third guide member 263, the third carrier rack 266 can be accurately inserted into the third insertion slot 267. Each suspension unit 264 is located on top of the corresponding third storage rack 260, and has a structure similar to that of the suspension unit 214. Particularly, each suspension unit 264 includes two rollers 2641 respectively located at inner and outer sides of the top plate 262. Each positioning unit 265 has a structure similar to that of the positioning unit 215, and is located between two adjacent ones of the suspension units 264 and above a corresponding third storage rack 260. Each positioning unit 265 includes a positioning member 2651 located at the outer side of the top plate 262.

In this embodiment, the number of the third storage rack 260 is one hundred and nineteen (119). The third storage racks 260 cooperate with the third carrier rack 266 to form a loop. Each third storage rack 260 is disposed between the bottom and top plates 261, 262, and has a structure similar to that of the first storage rack 210. The open side 2602 of each third storage rack 260 faces outward, while the closed side 2601 thereof faces inward. The two threaded bolts 2605 of each third storage rack 260 extend through the top plate 262 and the corresponding suspension unit 264, and protrude out of a top end of the corresponding suspension unit 264. Each of each third storage rack 260 and the third carrier rack 266 is formed with a plurality of receiving grooves 2603, 2663 spaced apart from each other along the length thereof. The third carrier rack 266 is removably inserted into the third insertion slot 267, and has a structure similar to that of the first carrier rack 216. The open side 2662 of the third carrier rack 266 faces outward, while the closed side 2661 thereof faces inward. The communication groove 2604, 2664 of each of each third storage rack 260 and the third carrier rack 266 is located at an inner side of the top plate 262 and is not covered by the same.

Figure 9:
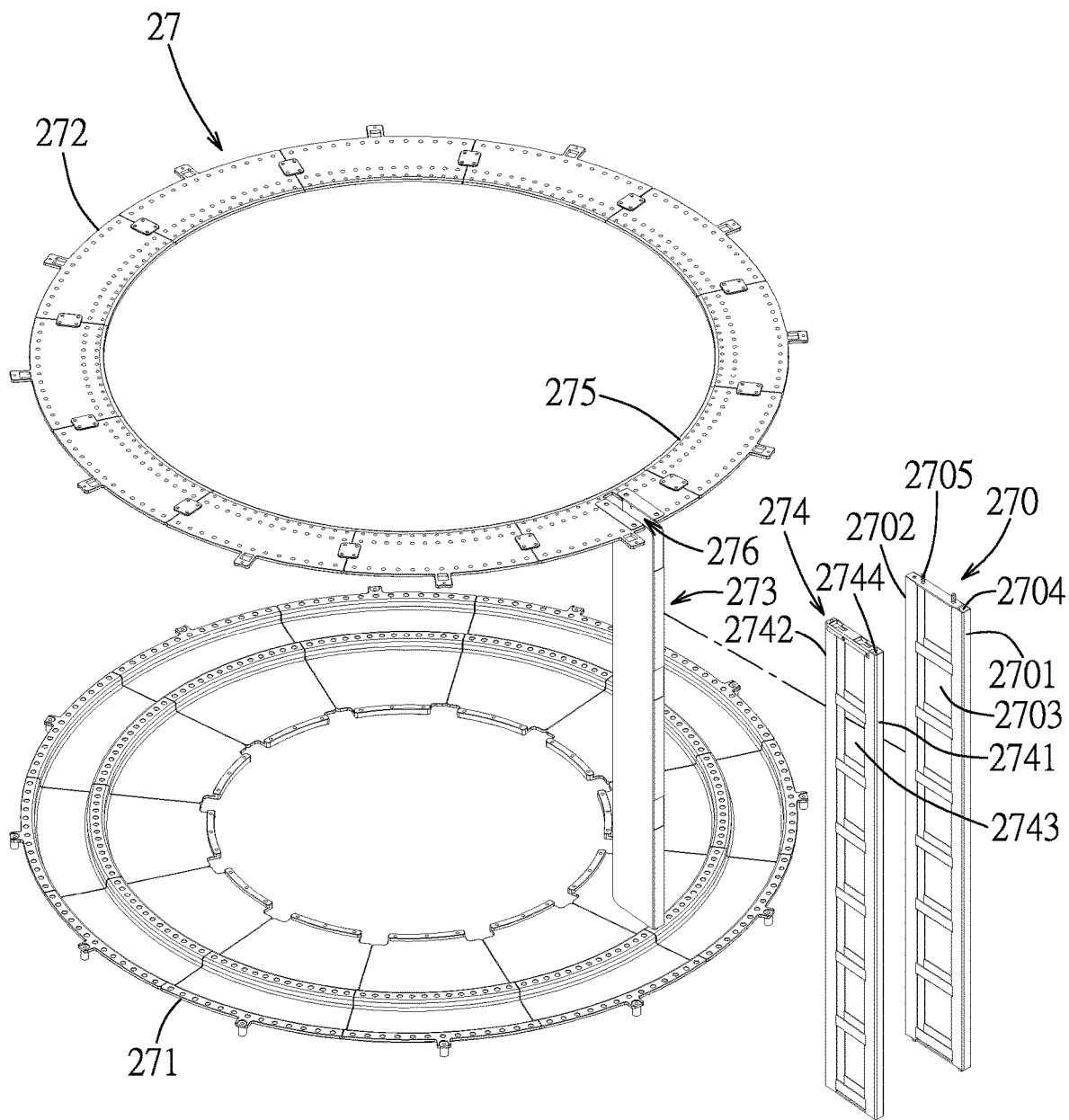
FIG. 9 is a partly exploded perspective view of a fourth storage assembly of the embodiment.

Referring to FIG. 9, in combination with FIGS. 4 and 5, the fourth storage assembly 27 is sleeved on the third storage assembly 26, and includes a bottom plate 271, a top plate 272, a fourth guide member 273 and a fourth carrier rack 274. Each of the bottom and top plates 271, 272 has a circular ring shape. The top plate 272 is coplanar with the top plate 262 of the third storage assembly 26. The top plate 272 has a top surface formed with a circular fourth guide groove 275 proximate to an inner periphery thereof. The fourth guide member 273 is disposed between the bottom and top plates 271, 272, and defines a fourth insertion slot 276 having an upward opening for insertion of the fourth carrier rack 274 therein. Through the guidance of the fourth guide member 273, the fourth carrier rack 274 can be accurately inserted into the fourth insertion slot 276.

In this embodiment, the number of the fourth storage racks 270 is one hundred and fifty five (155). The fourth storage racks 270 cooperate with the fourth carrier rack 274 to form a loop. Each fourth storage rack 270 is disposed between the bottom and top plates 271, 272, and has a structure similar to that of the first storage rack 210. The open side 2702 of each fourth storage rack 270 faces inward, while the closed side 2701 thereof faces outward. The two threaded bolts 2705 of each fourth storage rack 270 extend through the top plate 272 and protrude out of a top end of the top plate 272. The fourth carrier rack 274 is removably inserted into the fourth insertion slot 276, and has a structure similar to that of the first carrier rack 216. The open side 2742 of the fourth carrier rack 274 faces inward, while the closed side 2741 thereof faces outward. The communication groove 2704, 2744 of each of each fourth storage rack 270 and the fourth carrier rack 274 is located at an outer side of the top plate 272 and is not covered by the same.

With reference to FIGS. 5, 8 and 9, the two rollers 2641 of each suspension unit 264 are respectively received in and are respectively rollable along the third and fourth guide grooves 248, 275. The third storage assembly 26 is suspended on the second and fourth storage assemblies 24, 27 through the suspension units 264, and is rotatable relative to the second and fourth storage assemblies 24, 27. Through this, the third carrier rack 266 can be aligned with a selected one of the fourth storage racks 270, and the fourth carrier rack 274 can be aligned with a selected one of the third storage racks 260.

The second positioning grooves 252 of the second storage assembly 24 are located at inner sides of the third storage racks 260 and the third carrier rack 266. One of the second positioning grooves 252 is aligned with an inner side of the fourth carrier rack 274, while the rest of the second positioning grooves 252 are respectively aligned with inner sides of the fourth storage racks 270. The positioning member 2651 of each positioning unit 265 of the third storage assembly 26 is removably engageable with a corresponding one of the second positioning grooves 252. When the positioning member 2651 is rotated to a position aligned with the corresponding second positioning groove 252, the positioning member 2651 can automatically engage the corresponding second positioning groove 252 through a biasing force of a compression spring (not shown) that biases the positioning member 2651 to move downward. With the coordination of each positioning unit 265 and the corresponding second positioning groove 252, the third carrier rack 266 can be positioned aligned to any of the fourth storage racks 270, and the fourth carrier rack 274 can be positioned aligned to any of the third storage racks 260. Through this, relative rotation or vibration between the third and fourth storage assemblies 26, 27 can be prevented during the storage or removal of the sample.

Figure 10:
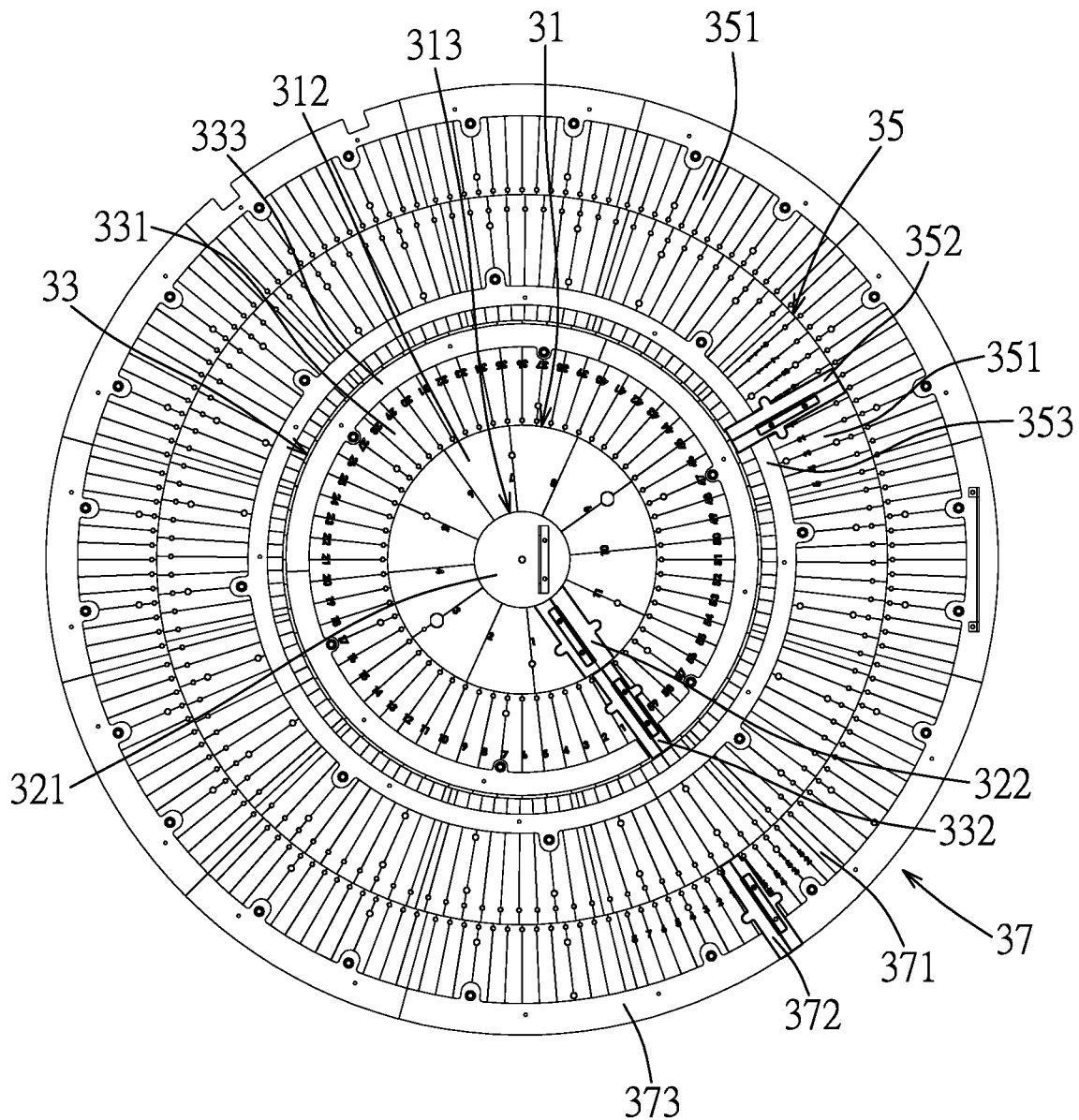
FIG. 10 is a top view of the protective cover device of the embodiment.
Figure 11:
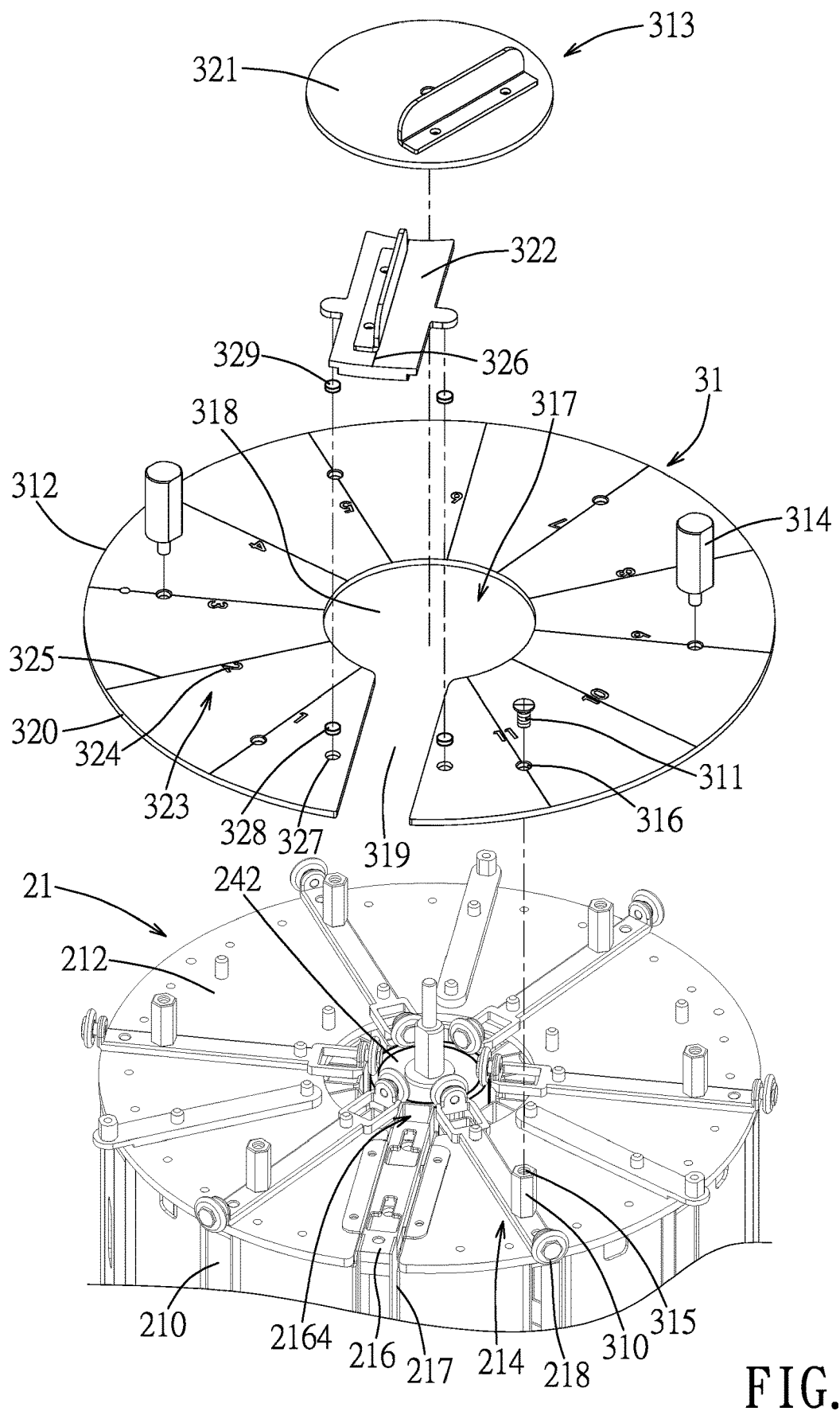
FIG. 11 is a partly exploded perspective view of the embodiment, illustrating an assembling relationship between a first protective cover assembly and the first storage assembly.

Referring to FIGS. 10 and 11, in combination with FIG. 6, the first protective cover assembly 31 includes a plurality of support studs 310, a plurality of locking bolts 311 (only one is shown in FIG. 11), a first cover plate 312, a first closure plate 313 and two grip members 314. Each support stud 310 has an internally threaded through hole 315. One of the threaded bolts 224 protruding out of the top end of the corresponding suspension unit 214 is threadedly connected to the internally threaded through hole 315 of a corresponding support stud 310. The first cover plate 312 has a circular ring shape, and is disposed on top ends of the support studs 310. The first cover plate 312 is formed with a plurality of annularly spaced-apart through holes 316 respectively communicating with the internally threaded through holes 315 of the support studs 310. Each locking bolt 311 extends through one of the through holes 316 and threadedly engages a respective internally threaded through hole 315. Through this, the first cover plate 312 is fixedly fastened to the support studs 310. In this embodiment, the top end of each support stud 310 is higher than the top end of each roller 218, so that the first cover plate 312 is raised and can be prevented from contacting or colliding with the rollers 218 after being fastened to the support studs 310. The two grip members 314 are disposed on the first cover plate 312 and are diametrically spaced apart from each other for grasping by the user's hands. In this way, the first protective cover assembly 31 and the first storage assembly 21 can be rotated through the grip members 314.

The first cover plate 312 covers the first storage racks 210, and is formed with a first opening 317 registered with the first carrier rack 216 and the central axle 242. The first closure plate 313 is openably connected to the first cover plate 312 for closing the first opening 317. Specifically, the first opening 317 has a central hole portion 318 and a side hole portion 319 communicating with the central hole portion 318. The central hole portion 318 is aligned with the central axle 242, the communication groove 223 of each first storage rack 210, and the communication groove 2164 of the first carrier rack 216. The side hole portion 319 extends from the central hole portion 318 to an outer circumferential edge 320 of the first cover plate 312, and is aligned with the other portions of the first carrier rack 216 apart from the communication groove 2164. The first closure plate 313 includes a central plate cover body 321 openably connected to the first cover plate 312 for closing the central hole portion 318, and a side plate cover body 322 openably connected to the first cover plate 312 for closing the side hole portion 319.

Through the configurations of the first opening 317 and the first closure plate 313, when the user desires to store or remove a sample, the central plate cover body 321 is opened to expose the communication groove 223 of each first storage rack 210 and the communication groove 2164 of the first carrier rack 216, so that storing or removal of the sample can be conducted. A detailed description of storing and removal of the sample will be described later. When the user desires to take out the first carrier rack 216, the central plate cover body 321 and the side plate cover body 322 are simultaneously opened to expose the first carrier rack 216. The user can then take out the first carrier rack 216 from the first insertion slot 217 through the first opening 317.

In this embodiment, the first cover plate 312 has a first color for the user to identify the location area of the first storage assembly 21. The first cover plate 312 includes a plurality of first indicator marks 323, each of which is aligned with the position of a respective first storage rack 210. Each first indicator mark 323 includes a first indicator number 324 engraved on the first cover plate 312 and aligned with the top of the respective first storage rack 210, and a first graduated line 325 engraved on the first cover plate 312 and proximate to the first indicator number 324. The first indicator numbers 324 are numbered 1 to 11, respectively, to indicate the number and location of the respective first storage racks 210. The side plate cover body 322 has a first alignment mark 326. In this embodiment, the first alignment mark 326 is a graduated line engraved on the side plate cover body 322.

More specifically, the first cover plate 312 has two concave grooves 327 indented inward from a top surface thereof and respectively disposed on two opposite sides of the side hole portion 319. The first protective cover assembly 31 further includes two magnets 328 respectively embedded in the concave grooves 327. The side plate cover body 322 has two magnets 329 for respectively and magnetically attracting the magnets 328. Through this mechanism, the side plate cover body 322 can be quickly and accurately aligned with the side hole portion 319, and can be stably positioned to a location which closes the side hole portion 319.

Figure 12:
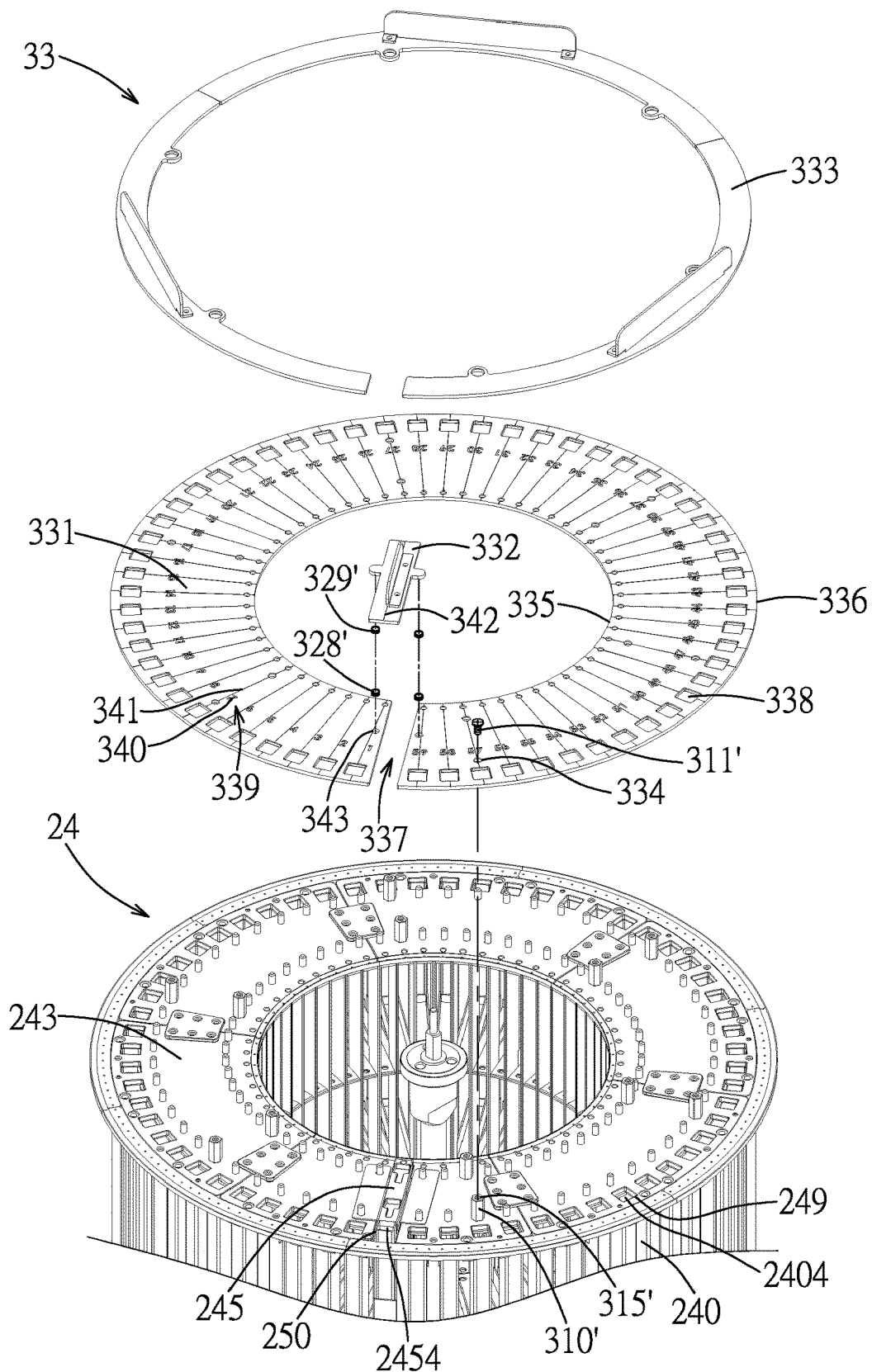
FIG. 12 is another partly exploded perspective view of the embodiment, illustrating an assembling relationship between a second protective cover assembly and the second storage assembly.

Referring to FIG. 12, in combination with FIGS. 7 and 10, the second protective cover assembly 33 includes a plurality of support studs 310', a plurality of locking bolts 311' (only one is shown in FIG. 12), a second cover plate 331, a second closure plate 332 and a plurality of first curved plates 333. One of the threaded bolts 2405 protruding out of the top end of the top plate 243 is threadedly connected to the internally threaded through hole 315' of a corresponding support stud 310'. The second cover plate 331 has a circular ring shape, and is disposed on top ends of the support studs 310'. The second cover plate 331 is formed with a plurality of annularly spaced-apart through holes 334 respectively communicating with the internally threaded through holes 315' of the support studs 310'. Each locking bolt 311' extends through one of the through holes 334 and threadedly engages a respective internally threaded through hole 315'. Through this, the second cover plate 331 is fixedly fastened to the support studs 310'.

The second cover plate 331 covers the second storage racks 240, and has an inner circumferential edge 335, an outer circumferential edge 336, a second opening 337 and a plurality of first through slots 338. The second opening 337 is formed between the inner and outer circumferential edges 335, 336, and is aligned with the second carrier rack 245. The second closure plate 332 is openably connected to the second cover plate 331 for closing the second opening 337. The first through slots 338 are annularly spaced apart from each other, are proximate to the outer circumferential edge 336, and are respectively aligned with the tops of the communication grooves 2404 of the second storage racks 240. The first curved plates 333 are arranged in a ring shape and are openably connected to the second closure plate 331 in proximity to the outer circumferential edge 336. The first curved plates 333 are configured to close the first through slots 338.

Through the configurations of the second opening 337 and the second closure plate 332, when the user desires to remove the second carrier rack 245 for storage or removal of the sample from the same, the second closure plate 332 is opened to expose the second carrier rack 245, and the second carrier rack 245 is removed from the second insertion slot 250 through the second opening 337 of the second protective cover assembly 33. Further, through the configurations of the first through slots 338 and the first curved plates 333, when the user desires to store or remove the sample in any of the second storage racks 240, the corresponding first curved plate 333 is opened to expose the communication groove 2404 of the corresponding second storage rack 240, so that storage or removal of the sample can be conducted.

Moreover, in this embodiment, the second cover plate 331 has a second color different from the first color for the user to clearly identify the location area of the second storage assembly 24. The second cover plate 331 includes a plurality of second indicator marks 339, each of which is aligned with the location of a respective second storage rack 240. Each second indicator mark 339 includes a second indicator number 340 engraved on the second cover plate 331 and aligned with the top of the respective second storage rack 240, and a second graduated line 341 engraved on the second cover plate 331 and proximate to the second indicator number 340. The second indicator numbers 340 of the second indicator marks 339 are numbered 1 to 59, respectively, to indicate the number and location of the respective second storage racks 240. The first alignment mark 326 of the side plate cover body 322 of the first closure plate 313 is configured to align with the second graduated line 341 of a selected one of the second indicator marks 339. Through this, the user can accurately align the first carrier rack 216 with the second storage rack 240 indicated by the second indicator mark 339 through alignment of the first alignment mark 326 with the second graduated line 241. The second closure plate 332 has a second alignment mark 342. In this embodiment, the second alignment mark 342 is a graduated line engraved on the second closure plate 332, and is configured to align with the first graduated line 325 of a selected one of the first indicator marks 323. Through this, the user can align the second carrier rack 245 with the first storage rack 210 indicated by the first indicator mark 323 through alignment of the second alignment mark 342 with the first graduated line 325.

More specifically, the second cover plate 331 has two concave grooves 343 indented inward from a top surface thereof and respectively disposed on two opposite sides of the second opening 337. The second protective cover assembly 34 further includes two magnets 328' respectively embedded in the concave grooves 343. The second closure plate 332 has two magnets 329' for respectively and magnetically attracting the magnets 328'. Through this mechanism, the second closure plate 332 can be quickly and accurately aligned with the second opening 337, and can be stably positioned to a location which closes the second opening 337.

Figure 13:
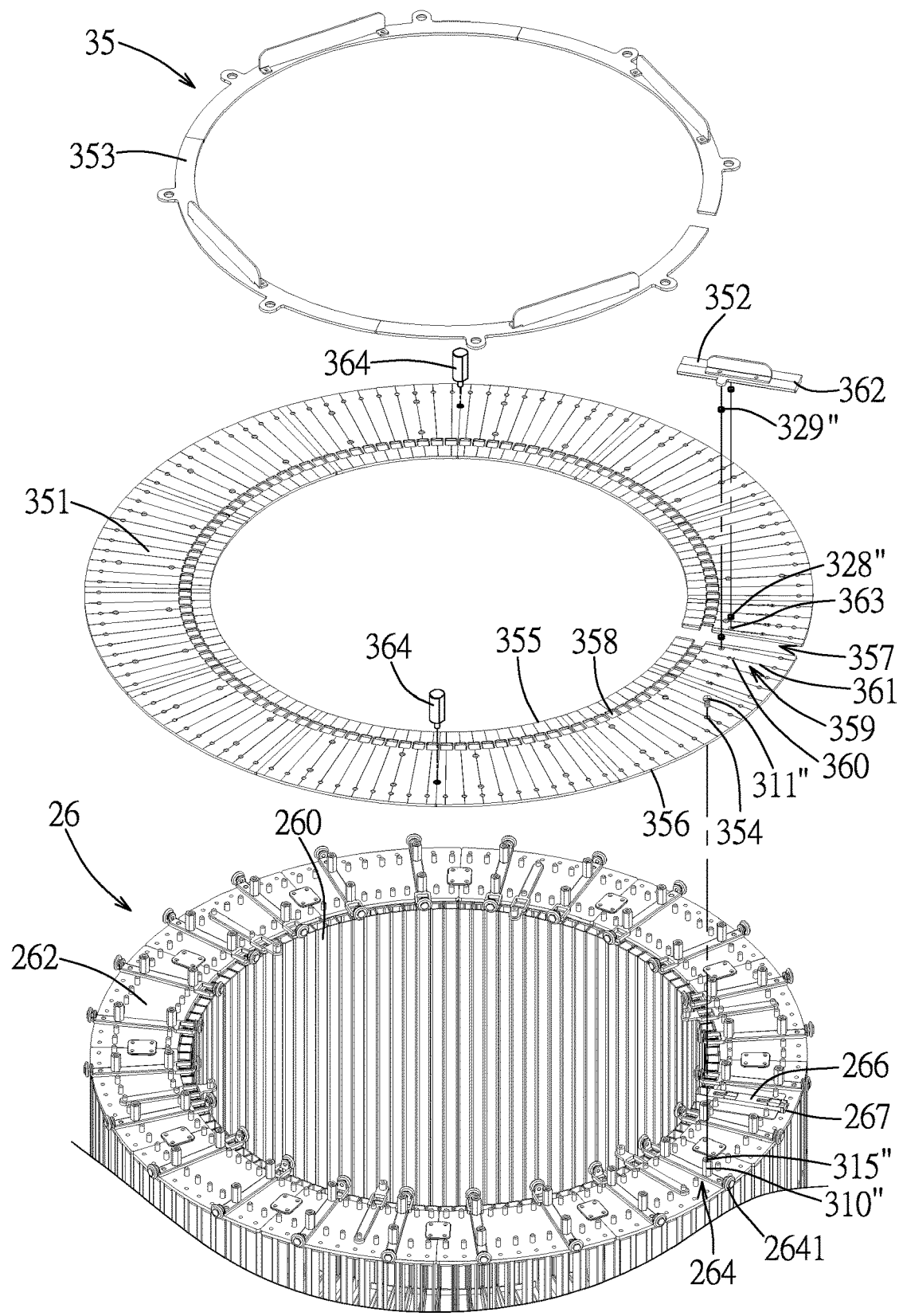
FIG. 13 is a yet another partly exploded perspective view of the embodiment, illustrating an assembling relationship between a third protective cover assembly and the third storage assembly.

Referring to FIG. 13, in combination with FIGS. 8 and 10, the third protective cover assembly 35 includes a plurality of support studs 310", a plurality of locking bolts 311" (only one is shown in FIG. 13), a third cover plate 351, a third closure plate 352 and a plurality of second curved plates 353. One of the threaded bolts 2605 that protrudes out of a top end of the corresponding suspension unit 264 is threadedly connected to the internally threaded through hole 315" of a corresponding support stud 310". The third cover plate 351 has a circular ring shape, and is disposed on top ends of the support studs 310". The third cover plate 351 is formed with a plurality of annularly spaced-apart through holes 354 respectively communicating with the internally threaded through holes 315" of the support studs 310". Each locking bolt 311" extends through one of the through holes 354 and threadedly engages a respective internally threaded through hole 315". Through this, the third cover plate 351 is fixedly fastened to the support studs 310". In this embodiment, the top end of each support stud 310" is higher than the top end of each roller 2641, so that the third cover plate 351 can be prevented from contacting or colliding with the rollers 2641 after being fastened to the support studs 310".

The third cover plate 351 covers the third storage racks 260, and includes an inner circumferential edge 355 and an outer circumferential edge 356. The third cover plate 351 is formed with a third opening 357 and a plurality of second through slots 358. The third opening 357 is formed between the inner and outer circumferential edges 355, 356, and is aligned with the third carrier rack 266. The third closure plate 352 is openably connected to the third cover plate 351 for closing the third opening 357. The second through slots 358 are annularly spaced apart from each other, are proximate to the inner circumferential edge 355, and are respectively aligned with the tops of the communication grooves 2604 of the third storage racks 240. The second curved plates 353 are arranged in a ring shape and are openably connected to the third cover plate 351 in proximity to the inner circumferential edge 355. The second curved plates 353 are configured to close the second through slots 358.

Through the configurations of the third opening 357 and the third closure plate 352, when the user desires to remove the third carrier rack 266 for storage or removal of the sample to or from the same, the third closure plate 352 is opened to expose the third carrier rack 266, and the third carrier rack 266 is removed from the third insertion slot 267 through the third opening 337 of the third protective cover assembly 35. Further, through the configurations of the second through slots 358 and the second curved plates 353, when the user desires to store or remove the sample in any of the third storage racks 260, the corresponding third curved plate 353 is opened to expose the communication groove 2604 of the corresponding third storage rack 260, so that storage or removal of the sample can be conducted.

Furthermore, in this embodiment, the third cover plate 351 has a third color different from the first and second colors for the user to clearly identify the location area of the third storage assembly 26. The third cover plate 351 includes a plurality of third indicator marks 359, each of which is aligned with the location of a respective third storage rack 260. Each third indicator mark 359 includes a third indicator number 360 engraved on the third cover plate 351 and aligned with the top of the respective third storage rack 260, and a third graduated line 361 engraved on the third cover plate 351 and proximate to the third indicator number 360. The third indicator numbers 360 of the third indicator marks 359 are numbered 1 to 119, respectively, to indicate the number and location of the respective third storage racks 260. The third closure plate 352 has a third alignment mark 362. In this embodiment, the third alignment mark 362 is a graduated line engraved on the third closure plate 352.

More specifically, the third cover plate 351 has two concave grooves 363 indented inward from a top surface thereof and respectively disposed on two opposite sides of the third opening 357. The third protective cover assembly 35 further includes two magnets 328″ respectively embedded in the concave grooves 363. The third closure plate 352 has two magnets 329″ for respectively and magnetically attracting the magnets 328″. Through this mechanism, the third closure plate 352 can be quickly and accurately aligned with the third opening 357, and can be stably positioned to a location which closes the third opening 357. Furthermore, the third protective cover assembly 35 further includes two grip members 364 disposed on the third cover plate 351 for grasping by the user's hands. The user can rotate the third protective cover assembly 35 and the third storage assembly 26 through the grip members 364.

Figure 14:
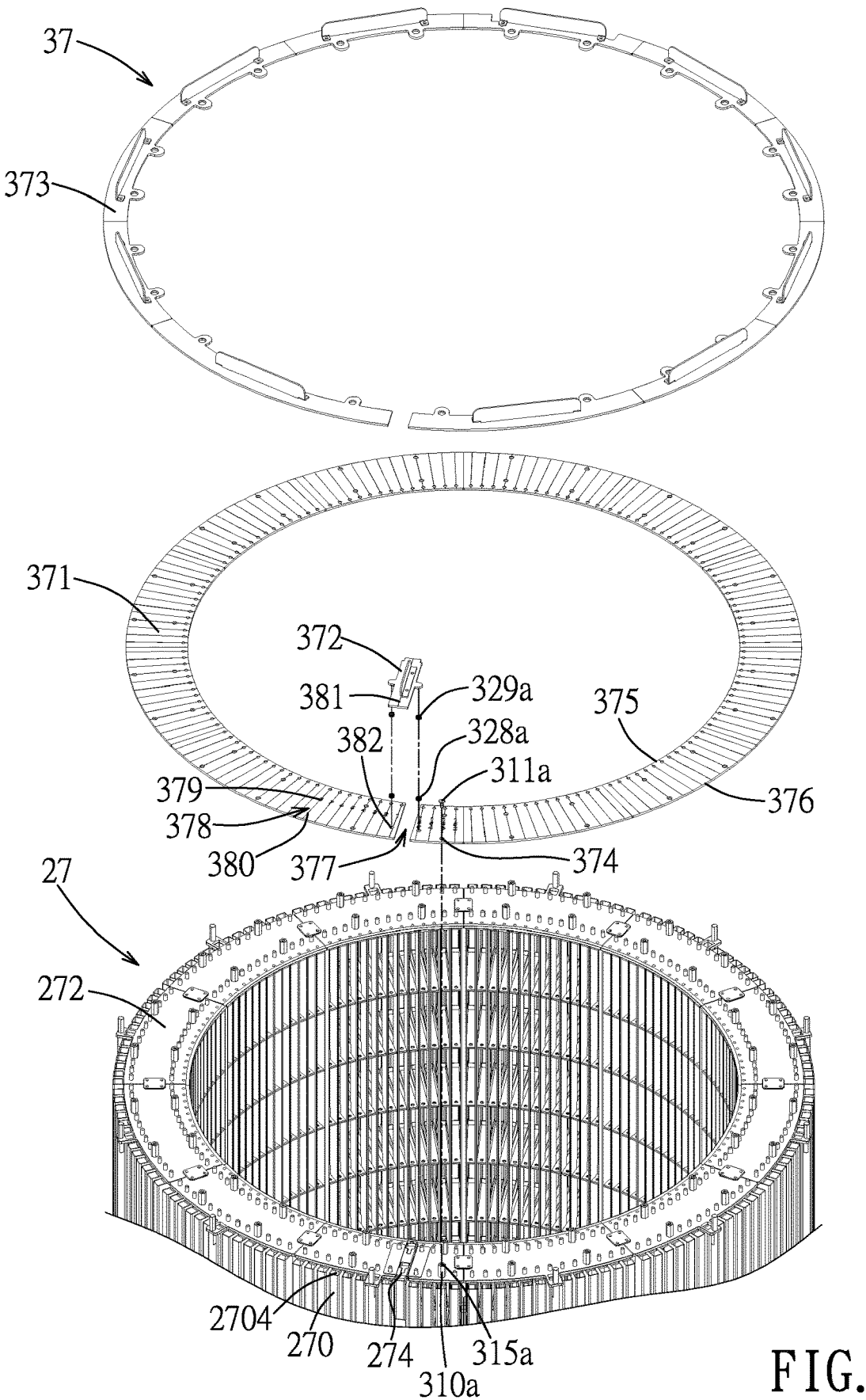
FIG. 14 is a still another partly exploded perspective view of the embodiment, illustrating an assembling relationship between a fourth protective cover assembly and the fourth storage assembly.

Referring to FIG. 14, in combination with FIGS. 9 and 10, the fourth protective cover assembly 37 includes a plurality of support studs (310a), a plurality of locking bolts (311a) (only one is shown in FIG. 14), a fourth cover plate 371, a fourth closure plate 372 and a plurality of third curved plates 373. One of the threaded bolts 2705 that protrudes out of a top end of the top plate 272 is threadedly connected to the internally threaded through hole (315a) of a corresponding support stud (310a). The fourth cover plate 371 has a circular ring shape, and is disposed on top ends of the support studs (310a). The fourth cover plate 371 is formed with a plurality of annularly spaced-apart through holes 374 respectively communicating with the internally threaded through holes (315a) of the support studs (310a). Each locking bolt (311a) extends through one of the through holes 374 and threadedly engages a respective internally threaded through hole (315a). Through this, the fourth cover plate 371 is fixedly fastened to the support studs (310a).

The fourth cover plate 371 covers the fourth storage racks 270, and has an inner circumferential edge 375, an outer circumferential edge 376, and a fourth opening 377. The fourth opening 377 is formed between the inner and outer circumferential edges 375, 376, and is aligned with the fourth carrier rack 274. The fourth closure plate 372 is openably connected to the fourth cover plate 371 for closing the fourth opening 377. The communication groove 2704 of each fourth storage rack 270 is exposed on the outer circumferential edge 376 of the fourth cover plate 371. The third curved plates 373 are arranged in a ring shape and are openably connected to the fourth closure plate 371 in proximity to the outer circumferential edge 376. The third curved plates 373 are configured to close the communication grooves 2704 of the fourth storage racks 270.

Through the configurations of the fourth opening 377 and the fourth closure plate 372, when the user desires to remove the fourth carrier rack 274 for storage or removal of the sample from the same, the fourth closure plate 372 is opened to expose the fourth carrier rack 274, and the fourth carrier rack 274 is removed from the fourth insertion slot 276 through the fourth protective cover assembly 37. Further, through the configurations of the third curved plates 373, when the user desires to store or remove the sample in any of the fourth storage racks 270, the corresponding fourth curved plate 373 is opened to expose the communication groove 2704 of the corresponding fourth storage rack 270, so that storage or removal of the sample can be conducted.

Furthermore, in this embodiment, the fourth cover plate 371 has a fourth color different from the first to third colors for the user to clearly identify the location area of the fourth storage assembly 27. The fourth cover plate 371 includes a plurality of fourth indicator marks 378, each of which is aligned with the location of a respective fourth storage rack 270. Each fourth indicator mark 378 includes a fourth indicator number 379 engraved on the fourth cover plate 371 and aligned with the top of the respective fourth storage rack 270, and a fourth graduated line 380 engraved on the fourth cover plate 371 and proximate to the fourth indicator number 379. The fourth indicator numbers 379 of the fourth indicator marks 378 are numbered 1 to 155, respectively, to indicate the number and location of the respective fourth storage racks 270. The third alignment mark 362 of the third closure plate 352 is configured to align with the fourth graduated line 380 of a selected one of the fourth indicator marks 378. Through this, the user can accurately align the third carrier rack 266 with the fourth storage rack 270 indicated by the fourth indicator mark 378 through alignment of the third alignment mark 362 with the fourth graduated line 380. The fourth closure plate 372 has a fourth alignment mark 381. In this embodiment, the fourth alignment mark 381 is a graduated line engraved on the fourth closure plate 372, and is configured to align with the third graduated line 361 of a selected one of the third indicator marks 359. Through this, the user can align the fourth carrier rack 274 with the third storage rack 260 indicated by the third indicator mark 359 through alignment of the fourth alignment mark 381 with the third graduated line 361.

More specifically, the fourth cover plate 371 has two concave grooves 382 indented inward from a top surface thereof and respectively disposed on two opposite sides of the fourth opening 377. The fourth protective cover assembly 37 further includes two magnets (328a) respectively embedded in the concave grooves 382. The fourth closure plate 372 has two magnets (329a) for respectively and magnetically attracting the magnets (328a). Through this mechanism, the fourth closure plate 372 can be quickly and accurately aligned with the fourth opening 377, and can be stably positioned to a location which closes the fourth opening 377.

Figure 15:
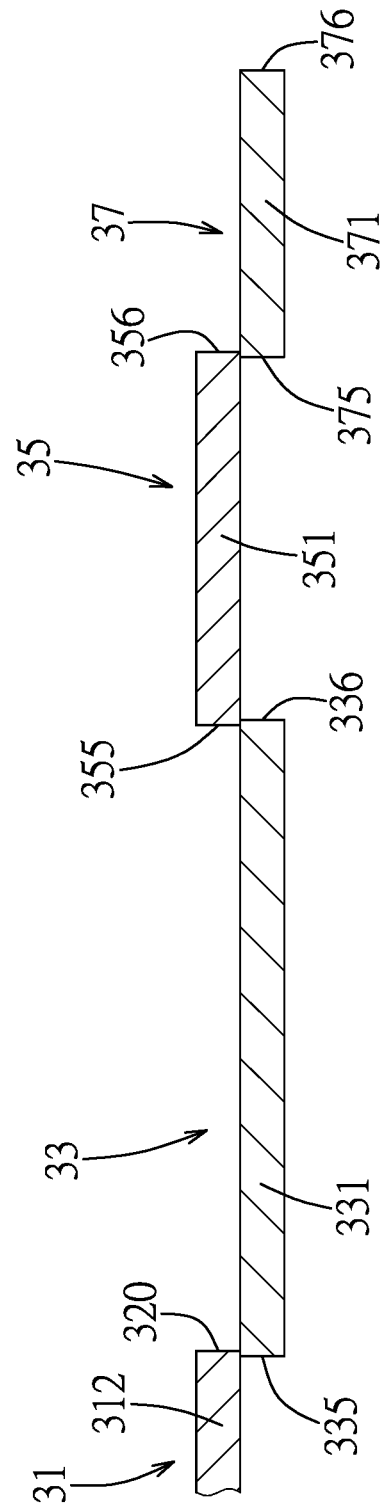
FIG. 15 is a fragmentary sectional view of the protective cover device of the embodiment, illustrating the position relationship between first, second, third and fourth cover plates.

Referring to FIG. 15, in combination with FIGS. 11 and 13, since each support stud 310 of the first protective cover assembly 31 is disposed on the top end of the corresponding suspension unit 214, the first cover plate 312 is disposed higher than the second cover plate 331. Further, since each support stud 310″ of the third protective cover assembly 35 is disposed on the top end of the corresponding suspension unit 264, the third cover plate 351 is disposed higher than the second cover plate 331 and the fourth cover plate 371. As such, the first cover plate 312 is prevented from colliding with the second cover plate 331 during rotation thereof, and the third cover plate 351 is prevented from colliding with the second and fourth cover plates 331, 371 during rotation thereof. Smooth rotation of each of the first and third protective cover assemblies 31, 35 can thus be enhanced.

Moreover, in this embodiment, a portion of the first cover plate 312 proximate the outer circumferential edge 320 thereof abuts with the top of a portion of the second cover plate 331 proximate the inner circumferential edge 335 thereof, a portion of the third cover plate 351 proximate the inner circumferential edge 355 thereof abuts with the top of a portion of the second cover plate 331 proximate the outer circumferential edge 336 thereof, and a portion of the third cover plate 351 proximate the outer circumferential edge 356 thereof abuts the top of a portion of the fourth cover plate 371 proximate the inner circumferential edge 375 thereof. As such, the amount of liquid nitrogen in the storage reservoir 111 (see FIG. 1) that volatilizes and that spills out of the barrel body 11 through the clearances between the first and second cover plates 312, 331, between the second and third cover plates 331, 351 and between the third and fourth cover plates 351, 371 can be reduced, thereby ensuring the safety in use. Additionally, the ice particles formed by the volatilized liquid nitrogen can be blocked from dropping through the clearances between the first and second cover plates 312, 331, between the second and third cover plates 331, 351 and between the third and fourth cover plates 351, 371 into the storage reservoir 111.

Figure 16:
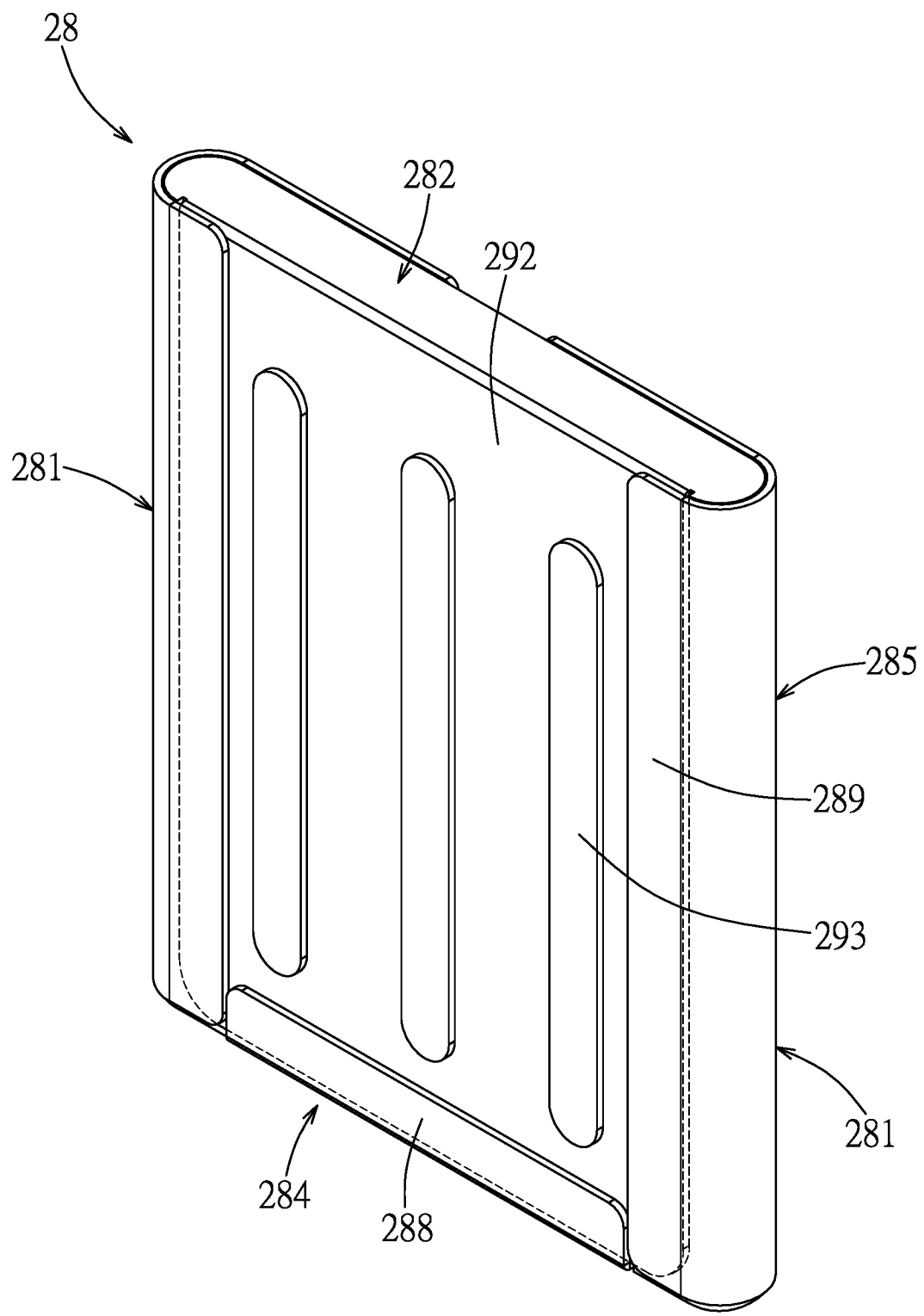
FIG. 16 is a perspective view of a storage box of the embodiment.
Figure 17:
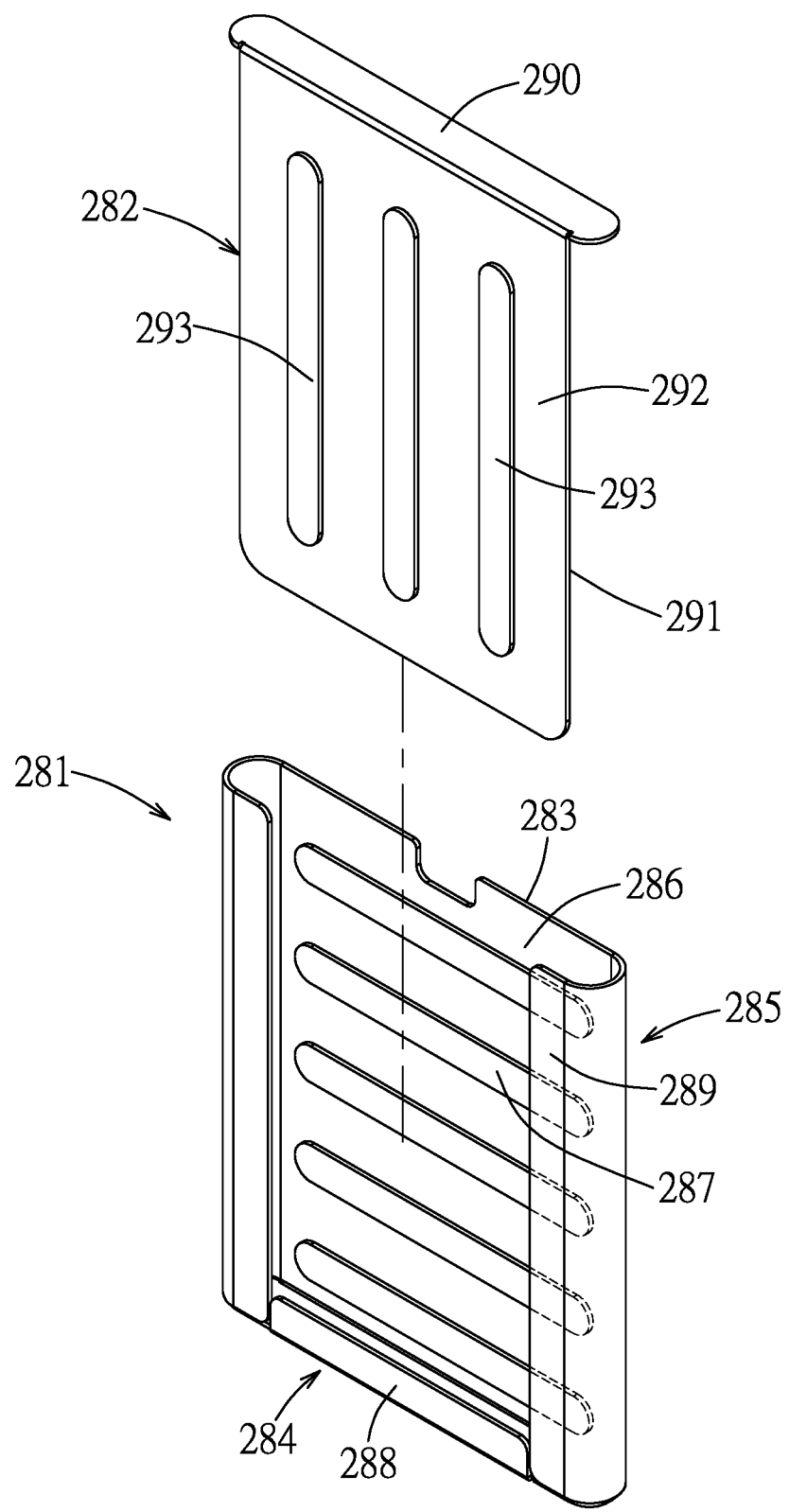
FIG. 17 is an exploded perspective view of the storage box of the embodiment.

Referring to FIGS. 16 and 17, the storage device 2 further includes a plurality of storage boxes 28. The storage boxes 28 are received removably and correspondingly in the receiving grooves 222 of each of the storage racks 210, 240, 260, 270 and carrier racks 216, 245, 266, 274. Each storage box 28 is configured for receiving a sample to be stored, and includes a shell 281 and a cover 282 removably connected to the shell 281. The shell 281 has a shell plate 283, a bottom plate 284 connected to a bottom end of the shell plate 283, two side plates 285 respectively connected to left and right sides of the shell plate 283. The shell plate 283 has an inner surface 286, and a plurality of first elongated ribs 287 protruding inward from the inner surface 286 and spaced apart from each other along the length of the shell plate 283. The first elongated ribs 287 are manufactured by a stamping process. The bottom plate 284 has a lower stop plate portion 288 extending upwardly and transversely from one end thereof and spaced apart from the inner surface 286. Each side plate 285 has a side stop plate portion 289 spaced apart from the inner surface 286. The side stop plate portions 289 of the side plates 285 are respectively located at left and right sides of the lower stop plate portion 288. The cover 282 includes a top plate 290 and a cover plate 291 extending downward from one end of the top plate 290. The top plate 290 is engaged to the inner surface 286 of the shell plate 283 and the two side plates 285. The cover plate 291 is disposed opposite to and spaced apart from the shell plate 283. The cover plate 291 has an outer surface 292, and a plurality of second elongated ribs 293 protruding outward from the outer surface 292 and spaced apart from each other along a width direction of the cover plate 291. The second elongated ribs 293 are manufactured by a stamping process. The lower stop plate portion 288 and the side stop plate portions 289 are configured to stop the outer surface 292 of the cover plate 291.

Through the configurations of the first and second elongated ribs 287, 293, the structural strengths of the shell plate 283 and the cover plate 291 can be enhanced. As such, when the stored sample is frozen and the volume thereof expands and deforms, the shell plate 283 and the cover plate 291 are not easily pushed and deformed by the stored sample. Through the inward protrusion of the first elongated ribs 287 from the inner surface 286, the expansion and deformation of the stored sample are limited toward the first elongated ribs 287; and through the outward protrusion of the second elongated ribs 293 from the outer surface 292, the second elongated ribs 293 are formed with spaces for receiving the stored sample when it expands and deforms. As such, the stored sample is guided to expand and deform toward the cover plate 291. Since the lower stop plate portion 288 and the side stop plate portions 289 are configured to stop the outer surface 292 of the cover plate 291, the cover plate 291 is limited from being pushed outward and deformed by the stored sample. Through the structural design of the shell 281 and the cover 282, the volume of the stored sample after expansion can be restricted within a certain range.

Figure 18:
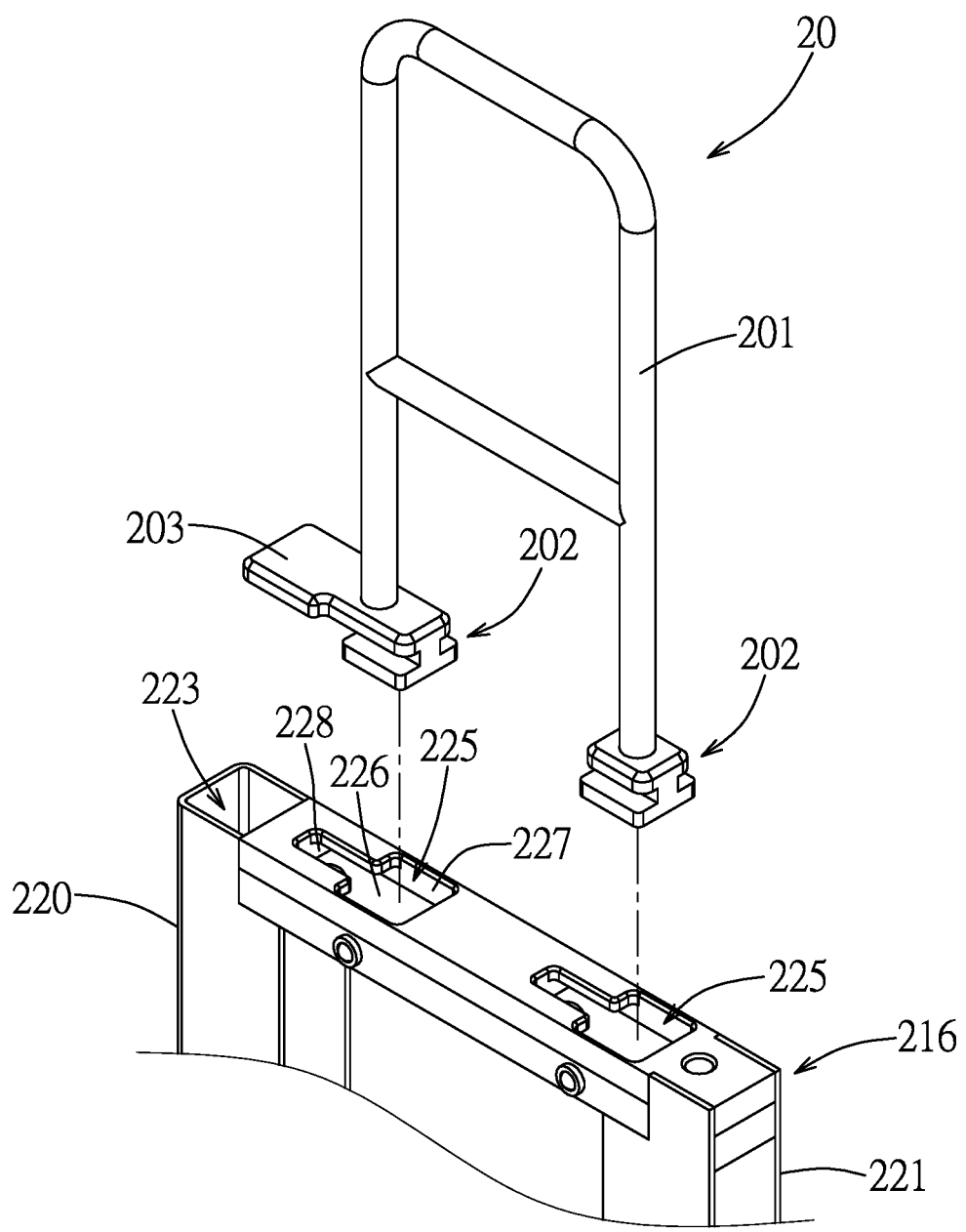
FIG. 18 illustrates an assembling relationship between a handle and a first carrier rack.
Figure 19:
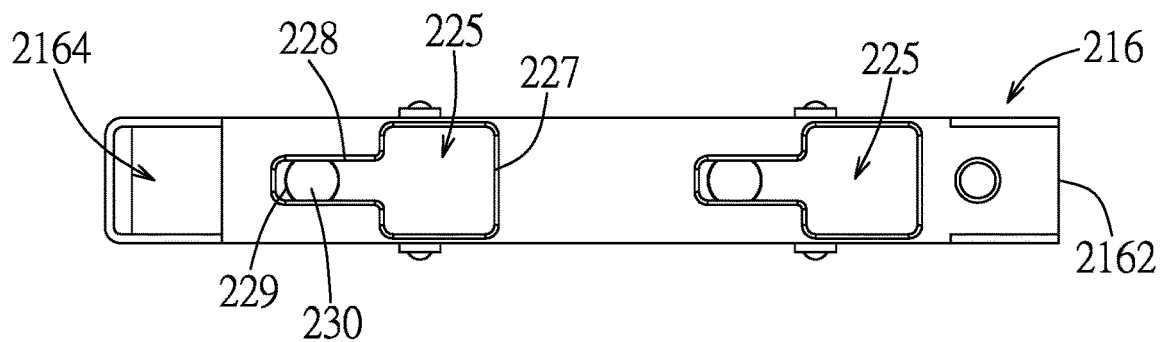
FIG. 19 is a schematic top view of the first carrier rack of the embodiment.
Figure 20:
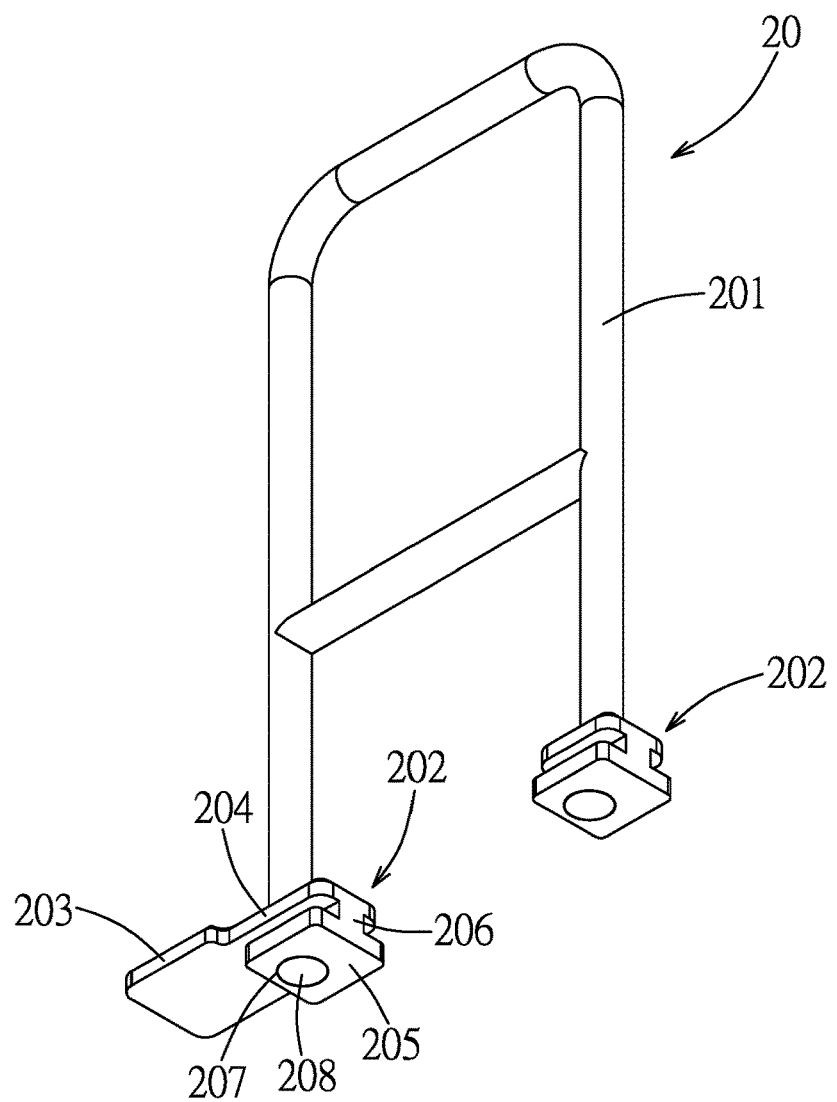
FIG. 20 is a perspective view of the handle of the embodiment.

Referring to FIGS. 18 to 20, the storage device 2 further includes a handle 20 removably connected to a top end of any of the carrier racks 216, 245, 266, 274. Since the structures of the first, second, third and fourth carrier racks 216, 245, 266, 275 are the same, only the first carrier rack 216 will be exemplified hereinafter. A top surface of the first carrier rack 216 is formed with two engaging grooves 225 respectively proximate to the communication groove 223 and the open side 221. Each engaging groove 225 has a groove portion 226, a first opening 227 communicating with the groove portion 226, and a second opening 228 communicating with the groove portion 226 and the first opening 227 and located between the first opening 227 and the communication groove 223. The second opening 228 has a width smaller than that of the first opening 227.

The handle 20 includes a generally inverted U-shaped grip portion 201 for gripping by the user, two engaging members 202 respectively disposed on two opposite ends of the grip portion 201, and a shielding plate 203. The engaging members 202 are configured to respectively engage the engaging grooves 225. Each engaging member 202 includes a top plate 204, a bottom plate 205, and a connecting plate 206 connected between the top and bottom plates 204, 205. The connecting plate 206 has a width smaller than that of each of the top and bottom plates 204, 205. The shielding plate 203 of this embodiment is integrally formed as one piece with the top plate 204 of one of the engaging members 202.

Figure 21:
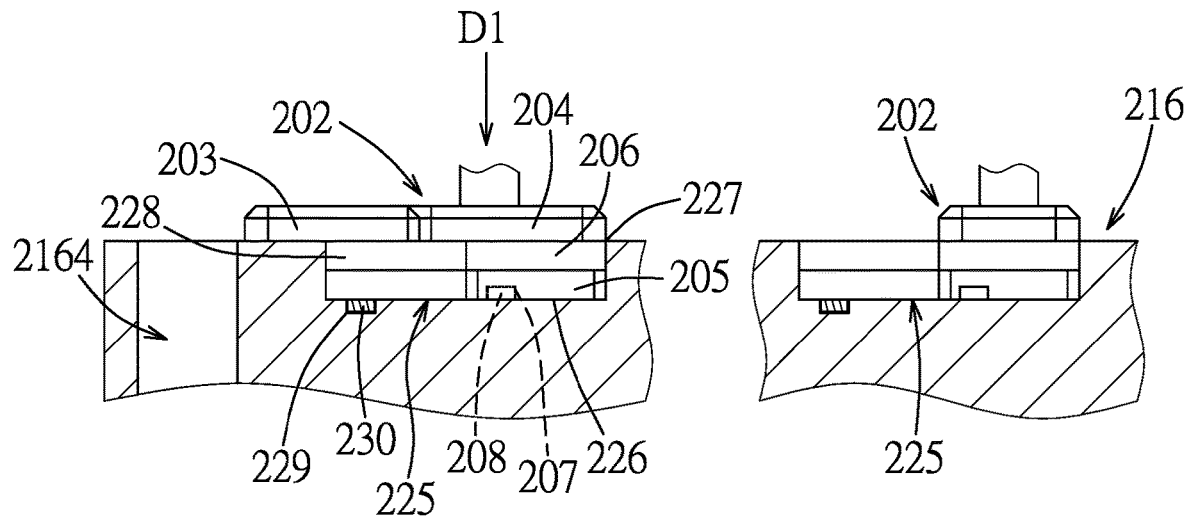
FIG. 21 is a fragmentary sectional view of the embodiment, illustrating how an engaging member of the handle extends into an engaging groove of the first carrier rack.
Figure 22:
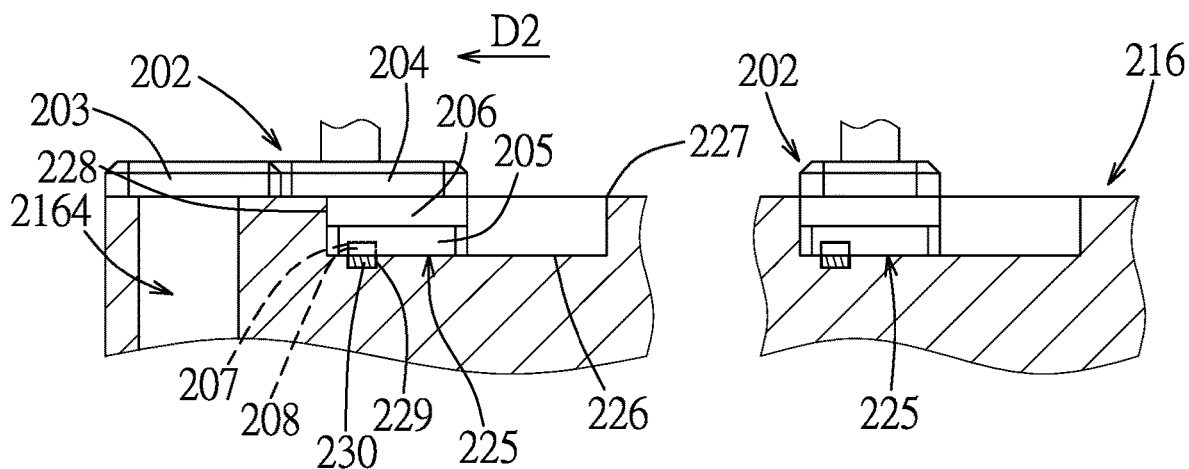
FIG. 22 is a view similar to FIG. 21, but illustrating the handle at an engaging position.

Referring to FIGS. 21 and 22, in combination with FIG. 18, to assemble the handle 20 to the first carrier rack 216, the two engaging members 202 are first aligned with the first openings 227 of the respective engaging grooves 225, after which the handle 20 is moved downward along the direction of arrow (D1) such that the bottom plate 205 of each engaging member 202 extends into the groove portion 226 of the respective engaging groove 225 via the first opening 227, and the connecting plate 206 extends into the first opening 227 and align with the second opening 228. Next, the handle 20 is pushed to move along the direction of arrow (D2) which is transverse to the direction of the arrow (D1), so that the bottom plate 205 and the connecting plate 206 of each engaging member 202 are respectively engaged to the groove portion 226 and the second opening 228 of the respective engaging groove 225, and the shielding plate 203 covers a top end of the communication groove 223. At this moment, the handle 20 is disposed at an engaging position, as shown in FIG. 22. Afterwards, the user can pull upward the handle 20 to remove the first carrier rack 216 from the first insertion slot 217, or push the handle 20 downward to insert the first carrier rack 216 into the first insertion slot 217.

To remove the handle 20 from the first carrier rack 216, the handle 20 is moved opposite to the direction of the arrow (D2) to a position, as shown in FIG. 21, so that the bottom plate 205 of each engaging member 202 is aligned with the first opening 227 of the respective engaging groove 225, and the connecting plate 206 of each engaging member 202 is moved into the first opening 227 of the respective engaging groove 225. Next, the handle 20 is pulled upward opposite to the direction of the arrow (D1) so that each engaging member 202 is moved out of the respective engaging groove 225 via the first opening 227, thereby removing the handle 20 from the first carrier rack 216.

With reference to FIGS. 19, 20 and 22, to securely position the handle 20 at the engaging position and prevent removal of the engaging members 202 from the respective engaging grooves 225, in this embodiment, each engaging groove 225 further has an indentation 229 communicating with the groove portion 226 and aligned with the second opening 228. The first carrier rack 216 further includes two first magnets 230 respectively embedded in the indentations 229. The bottom plate 205 of each engaging member 202 is formed with an indentation 207. The handle 20 further includes two second magnets 208 respectively embedded in the indentations 207. When the handle 20 is moved to the engaging position, each second magnet 208 is magnetically attracted to the respective first magnet 230, thereby securely positioning the handle 20 at the engaging position.

Because the handle 20 can be removably connected to a top end of any carrier racks 216, 245, 266, 275, and because each carrier rack 216, 245, 266, 275 is insertedly positioned in the respective insertion slot 217, 250, 267, 276 in a normal use state, when it is desired to take out one of the carrier racks 216, 245, 266, 275 from the storage device 2 and the storage barrel 1, the handle 20 is connected to the one of the carrier rack 216, 245, 266, 275 to facilitate removal of the same, so that storage or removal of the storage box 28 can be conducted. After the storage or removal of the storage box 28 is completed, the one of the carrier racks 216, 245, 266, 275 is re-inserted into the respective insertion slot 217, 250, 267, 276. As such, excessive temperature difference between the one of the carrier racks 216, 245, 266, 275 and the liquid nitrogen in the storage reservoir 111 can be prevented. That is, when the one of the carrier racks 216, 245, 266, 275 is re-inserted into the respective insertion slot 217, 250, 267, 276, the temperature of the liquid nitrogen will not increase and reach a boiling point.

Furthermore, because the shielding plate 203 covers the top end of the communication groove 223 of the one of the carrier racks 216, 245, 266, 275 when the handle 20 is at the engaging position, liquid nitrogen is prevented from spurting out of the communication groove 223 and hurting the user's hand. Hence, by using the handle 20 to remove or insert each carrier rack 216, 245, 266, 275 can enhance the safety of the user.

Figure 23:
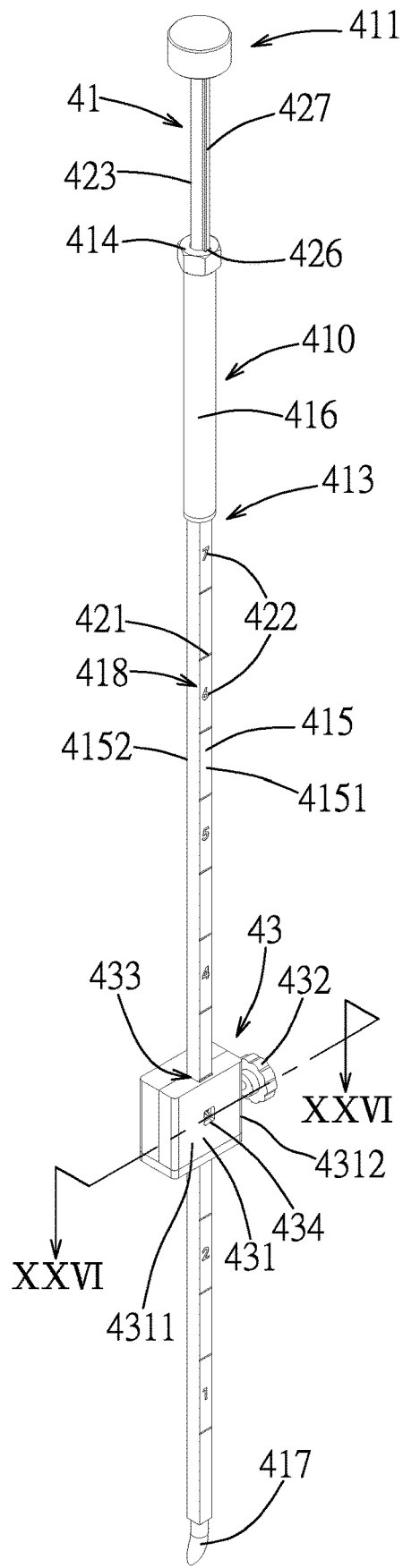
FIG. 23 is a perspective view of a pushing device of the embodiment.

Referring to FIG. 23, in combination with FIGS. 6 to 9, the storage apparatus 100 further includes a pushing device 4. The pushing device includes a push rod assembly 41 and a depth adjustment assembly 43 disposed on the push rod assembly 41. The push rod assembly 41 is insertable into the communication groove 2164, 2454, 2664, 2744, 223, 2404, 2604, 2704 of a selected one of the carrier or storage racks 216, 245, 266, 275, 210, 240, 260, 270. The depth adjustment assembly 43 is used to adjust the depth of the push rod assembly 41 inside the communication groove 2164, 2454, 2664, 2744, 223, 2404, 2604, 2704, so that the push rod assembly 41 can push a storage box 28 disposed at a selected position of the carrier rack 216, 245, 266, 275 into the corresponding storage rack 210, 240, 260, 270, or a storage box 28 disposed at a selected position of the storage rack 210, 240, 260, 270 into the corresponding carrier rack 216, 245, 266, 275.

Figure 24:
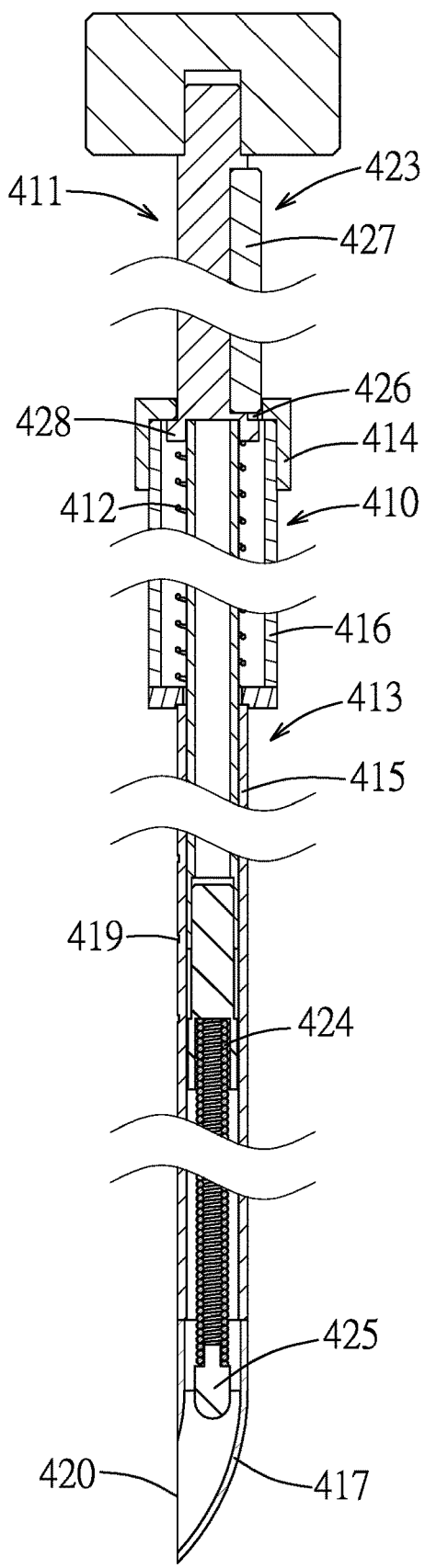
FIG. 24 is a fragmentary sectional view of the pushing device of the embodiment.

Referring to FIG. 24, in combination with FIG. 23, specifically, the push rod assembly 41 includes a tube member 410, a push rod unit 411 and a return spring 412. The tube member 410 includes a tube body 413 and a nut 414. The tube body 413 includes an insertion tube portion 415, a grip tube portion 416 connected to a top end of the insertion tube portion 415, and a guide tube portion 417 connected to a bottom end of the insertion tube portion 415. A horizontal cross section of the insertion tube portion 415 is square. A first side 4151 of the insertion tube portion 415 is engraved with a plurality of depth indicator marks 418 spaced apart from each other in a top-bottom direction. A second side 4152 of the insertion tube portion 415, which is opposite to the first side 4151 and the depth indicator marks 418, are formed with a plurality of positioning grooves 419 spaced apart from each other in the top-bottom direction and respectively corresponding in position to the depth indicator marks 418. The grip tube portion 416 is configured for gripping by the user. The nut 414 is threadedly connected to a top end of the grip tube portion 416. The guide tube portion 417 is formed with a side opening 420 flush with the outer surface of the insertion tube portion 415 having the positioning grooves 419.

In this embodiment, the number of the receiving grooves 222, 2403, 2603, 2703, 2163, 2453, 2663, 2743 in each of the storage or carrier racks 210, 240, 260, 270, 216, 245, 266, 275 is seven (7), and the number of the depth indicator marks 418 is also seven (7). The depth indicator marks 418 respectively indicate the positions of the receiving grooves 222, 2403, 2603, 2703, 2163, 2453, 2663, 2743. Each depth indicator mark 418 includes an alignment graduated line 421, and an indicator number 422 proximate to the bottom of the alignment graduated line 421. The indicator numbers 422 are numbered 7 to 1 from top to bottom to correspond to the numbering of the receiving grooves 222, 2403, 2603, 2703, 2163, 2453, 2663, 2743. The indicator numbers 422 respectively correspond in position to the positioning groove 419.

The push rod unit 411 includes a pressing lever 423, a spring 424 connected to a bottom end of the pressing lever 423, and a pushing member 425 connected to a bottom end of the spring 424. The pressing lever 423 has a portion extending through the grip tube portion 416 into the insertion tube portion 415, and another portion protruding out of a top end of the nut 414. The spring 424 is located within the insertion tube portion 415. The user can depress the pressing lever 423 to push the spring 424 and the pushing member 425 to move downward. During the downward movement of the pushing member 425, the pushing member 425 is guided by a curved guide wall of the guide tube portion 417 to move toward the side opening 420. The spring 424 is bent and deformed when the pushing member 425 moves toward the side opening 420. When the pushing member 425 and the spring 424 protrude out of the side opening 420, the pushing member 425 can push the storage box 28. Moreover, the nut 414 of this embodiment is formed with a limiting guide groove 426. The pressing lever 423 has an elongated protrusion 427 inserted into the limiting guide groove 426. The length of the protrusion 427 extends in a direction similar to an axis of the pressing lever 423. Through the coordination of the limiting guide groove 426 and the protrusion 427, the pressing lever 423 is prevented from rotating relative to the nut 414, and the spring 424 is prevented from rotating relative to the insertion tube portion 415. Through this, each time the spring 424 protrudes out of the side opening 420 through the guide tube portion 417, the manner and direction of bending and deformation of the spring 424 are ensured to remain the same so as to enhance the smooth operation thereof.

The return spring 412 is a compression spring sleeved on the pressing lever 423 and located in the grip tube portion 416. Upper and lower ends of the return spring 412 respectively abut against a flange portion 428 of the pressing lever 423 and a bottom end of the grip tube portion 416. The return spring 412 provides a restoring force for the push rod unit 411.

Figure 25:
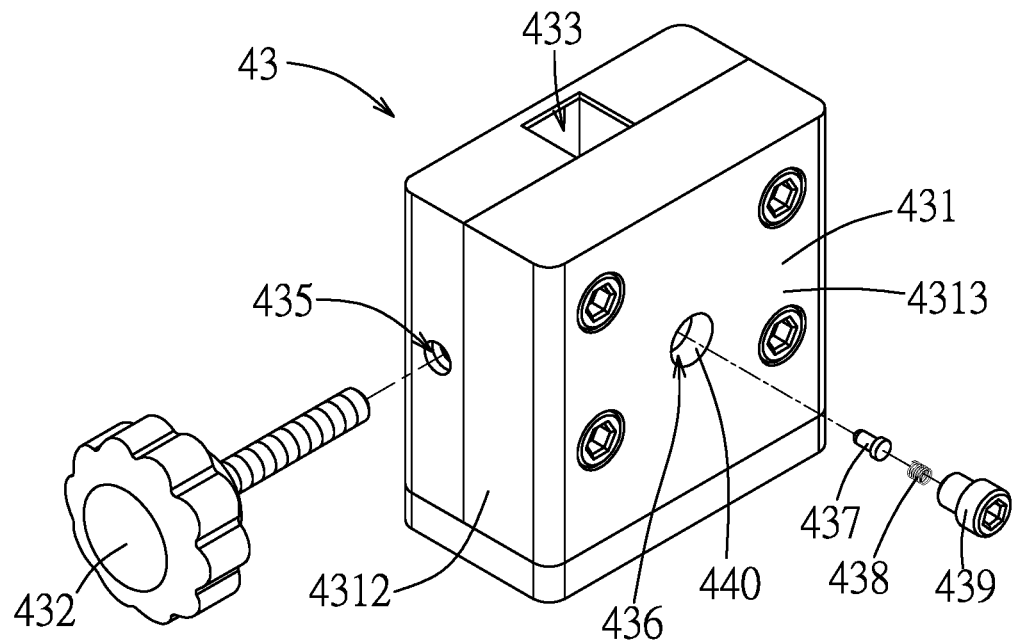
FIG. 25 is an exploded perspective view of a depth adjustment assembly of the embodiment.
Figure 26:
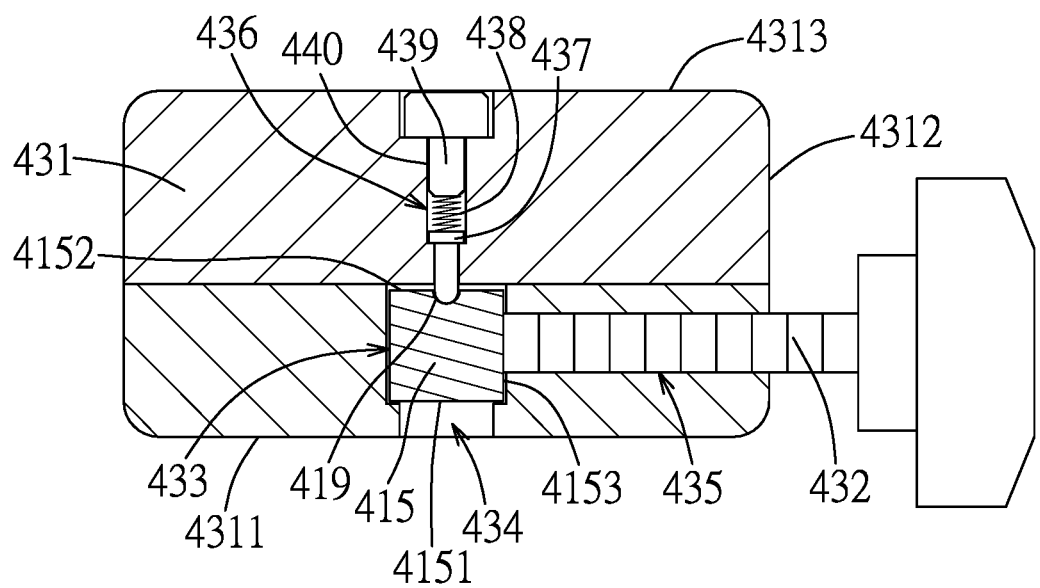
FIG. 26 is a sectional view taken along line XXVI-XXVI of FIG. 23.

Referring to FIGS. 25 and 26, in combination with FIG. 23, the depth adjustment assembly 43 includes a positioning block 431 and a fastening member 432. The positioning block 431 is sleeved on the insertion tube portion 415 and is slidable along the length thereof. The positioning block 431 is configured to abut against a top end of the cover plate 312, 331, 351, 371 of each protective cover assembly 31, 33, 35, 37. The positioning block 431 is formed with a through perforation 433 extending through top and bottom ends thereof for insertion of the insertion tube portion 415 therethrough. The through perforation 433 has a square shape similar to the horizontal cross section of the insertion tube portion 415, so that the positioning block 431 cannot rotate relative to the insertion tube portion 415. The top end of the positioning block 431 is configured to align with the alignment graduated line 421 of a selected one of the depth indicator marks 418. A viewing hole 434 is formed in a first side 4311 of the positioning block 431 which corresponds to the first side 4151 of the insertion tube portion 415, and communicates with the through perforation 433. The viewing hole 434 is configured to align with the indicator number 422 of the selected depth indicator mark 418 to expose the same. Through the viewing hole 434, the user can see and view the indicator number 422 aligned by the positioning block 431. A second side 4312 of the positioning block 431, which is transverse to the first side 4311, is formed with a threaded hole 435 communicating with the through perforation 433. The fastening member 432 is a threaded bolt threadedly connected to the threaded hole 435. The fastening member 432 has an end surface for pressingly contacting a third side 4153 of the insertion tube portion 415 which is transverse to the first and second sides 4151, 4152 thereof. Through this, the positioning block 431 can be fixed to the insertion tube portion 415 at a selected position.

Moreover, the positioning block 431 has a third side 4313 that is opposite to the first side 4131 and the viewing hole 434 and that is formed with a receiving hole 436 communicating with the through perforation 433. The depth adjustment assembly 43 further includes a positioning pin 437 received in the receiving hole 436, a biasing spring 438 received in the receiving hole 436, and a threaded bolt 439 threadedly connected to a threaded hole portion 440 of the receiving hole 436. The positioning pin 437 is removably engaged to a corresponding one of the positioning grooves 419. The biasing spring 438 is a compression spring having two opposite ends respectively abutting against the positioning pin 437 and the threaded bolt 439 for biasing the positioning pin 437 toward the insertion tube portion 415. When the user slides the positioning block 431 along the insertion tube portion 415 until the top end of the positioning block 431 aligns with the alignment graduated line 421 of a selected one of the depth indicator marks 418, through the biasing force of the biasing spring 438 against the positioning pin 437, the positioning pin 437 automatically engages a corresponding positioning groove 419, thereby positioning the positioning block 431 on the insertion tube portion 415. Through this, apart from enabling the user to know that the positioning block 431 is already slid to a position aligned with the alignment graduated line 421 of the selected depth indicator mark 418, the user can also conveniently perform rotation of the fastening member 432 so as to pressingly contact the fastening member 432 against the insertion tube portion 415.

An operation of the storage apparatus 100 is described below.

Figure 2:
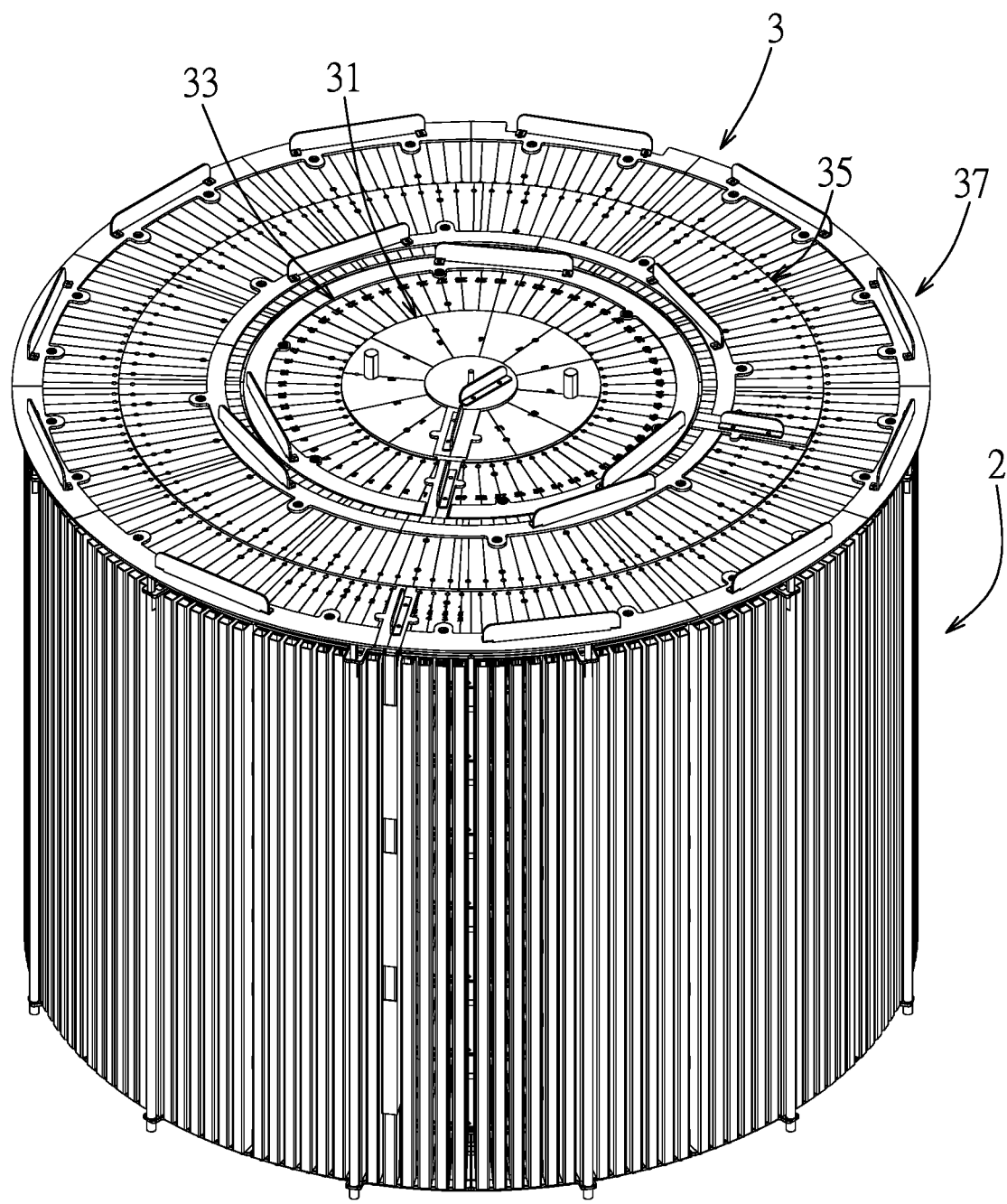
FIG. 2 is a perspective view of a storage device and a protective cover device of the embodiment.

When a user desires to store a storage box 28 in, for example, number 5 of the receiving groove 2403 of number 52 of the second storage rack 240 of the second storage assembly 24, the operation is as follows:

With reference to FIGS. 1 and 2, the cover body 12 of the storage barrel 1 is first opened. Because the protective cover device 3 covers the top end of the storage device 2, rapid volatilization of liquid nitrogen in the storage barrel 1 that leads to generation of fog and low visibility can be prevented. Hence, the user can clearly see the colors, the indicator marks and the alignment marks of each protective cover assembly of the protective cover device 3.

Figure 27:
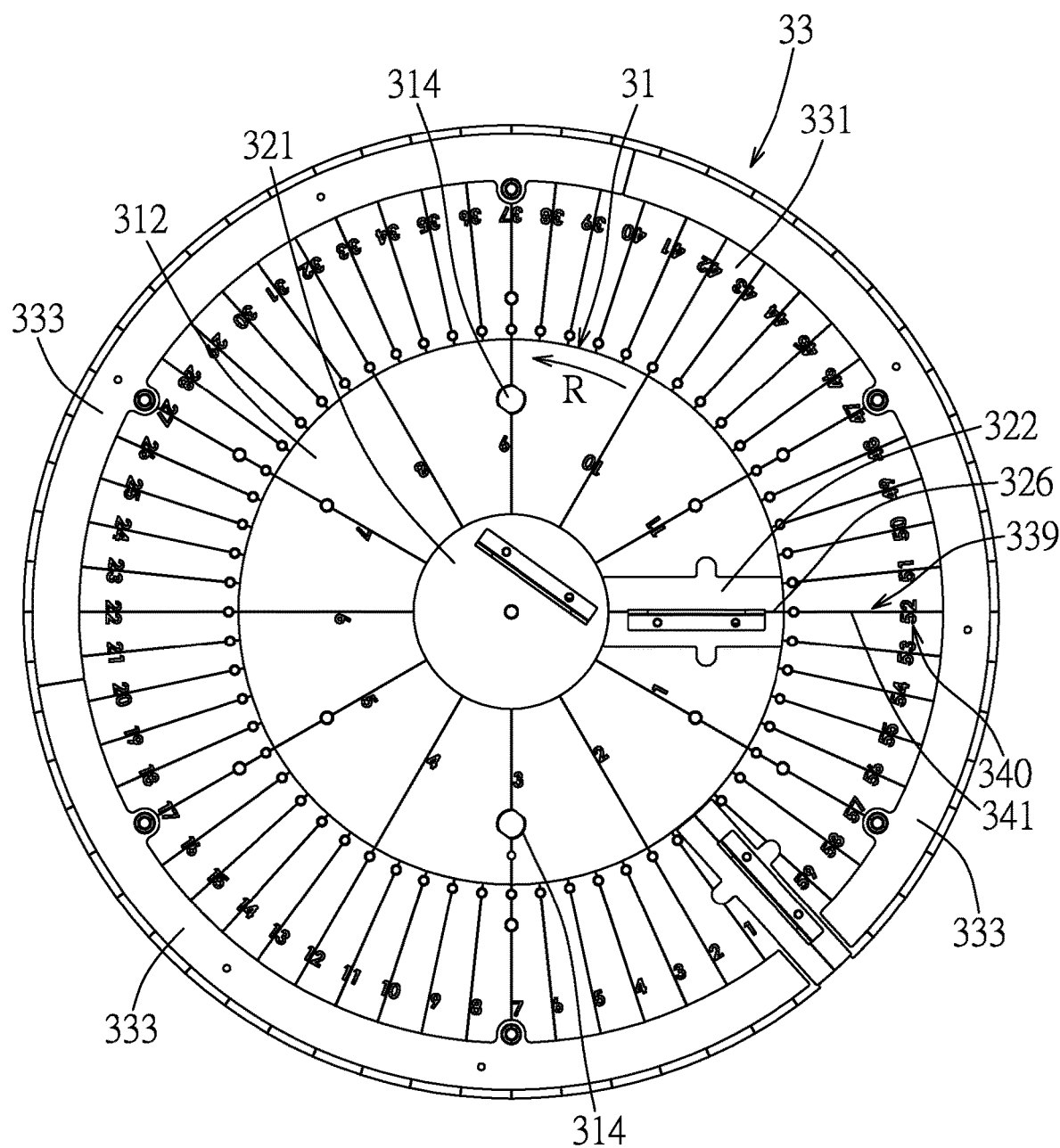
FIG. 27 is an enlarged schematic top view of a portion of the protective cover device of the embodiment, illustrating a first alignment mark of a side cover being aligned with a second graduated line of a second indicator mark.

Referring to FIG. 27, in combination with FIG. 10, since the colors of the first and second cover plates 312, 331 are different, the position of each of the first and second protective cover assemblies 31, 33 can be clearly identified. The grip members 314 of the first protective cover assembly 31 are rotated in the direction of an arrow (R) to rotate the first protective cover assembly 31 relative to the second protective cover assembly 33. During rotation of the first protective cover assembly 31, the first storage assembly 21 is driven to rotate therealong. When the side plate cover body 322 is rotated to a position, where the first alignment mark 326 is aligned with the second graduated line 341 of the number 52 of the second indicator number 340 of the second cover plate 331, rotation of the first protective cover assembly 31 is stopped. At this time, the first carrier rack 216 is aligned with the number 52 of the second storage rack 240.

Figure 28:
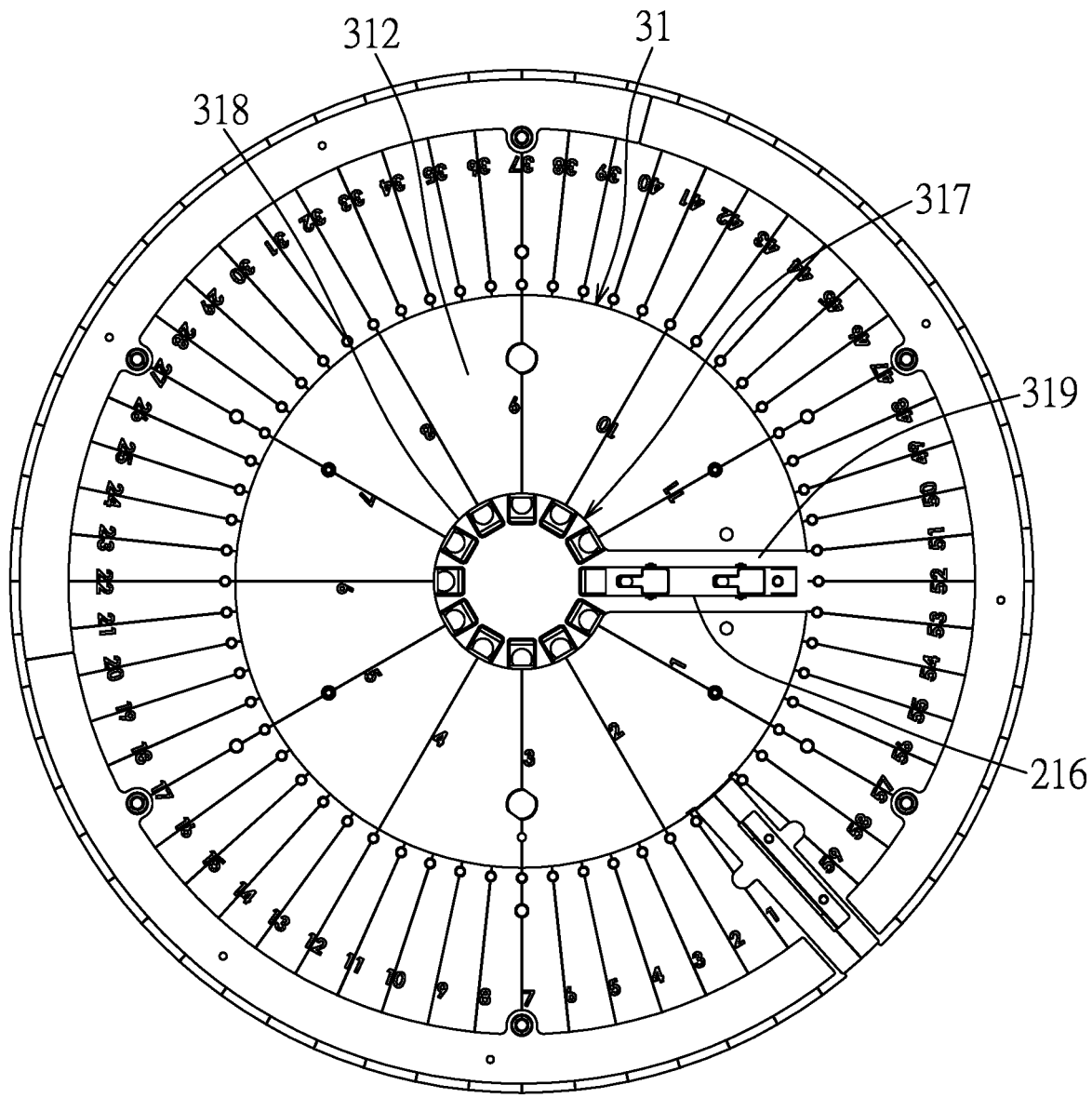
FIG. 28 is a view similar to FIG. 27, but illustrating a central cover and the side cover being opened to expose the first carrier rack.
Figure 29:
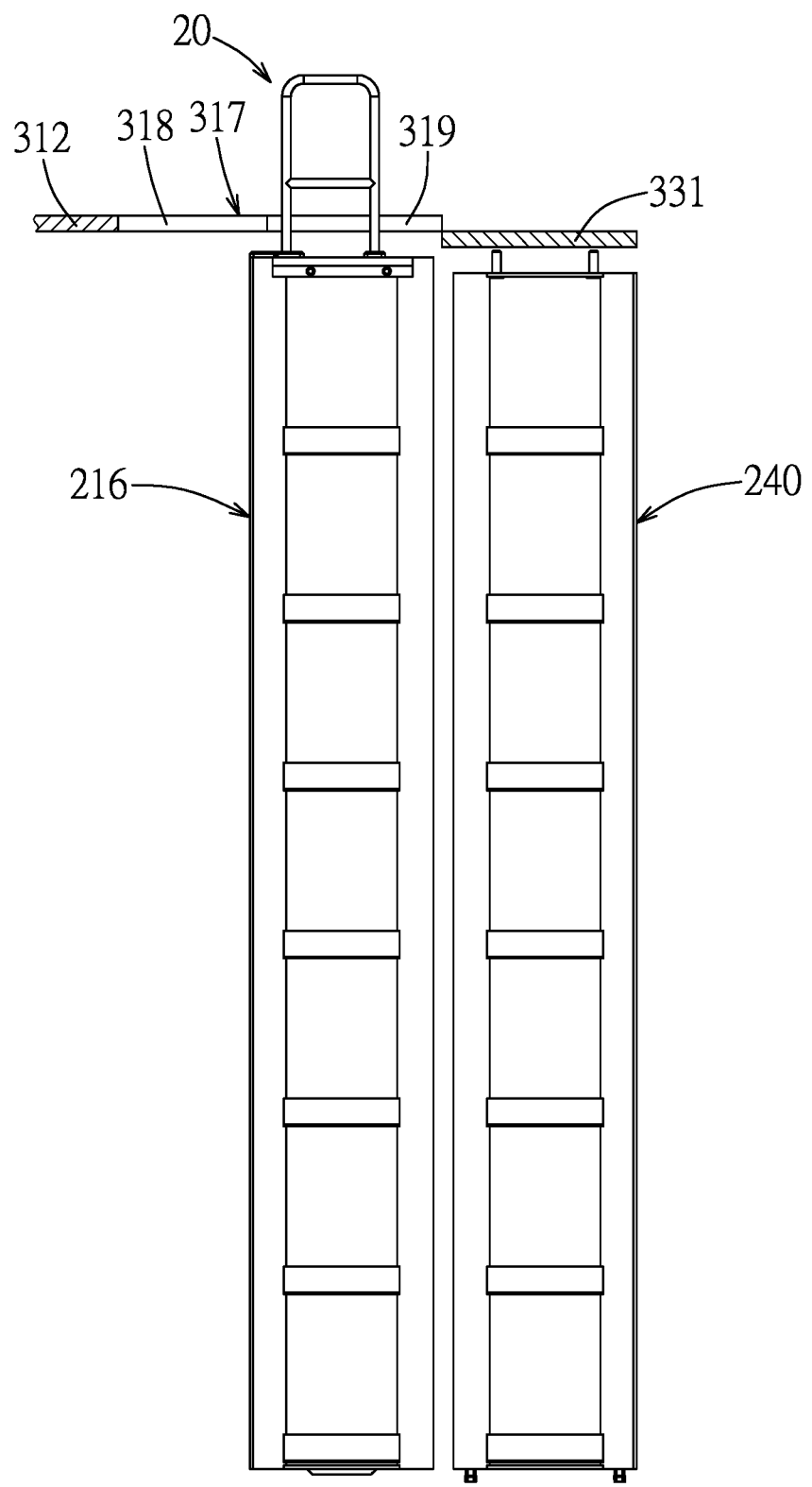
FIG. 29 is a partly sectional view of the embodiment, illustrating the first carrier rack being aligned with a second storage rack and the handle being assembled to a top end of the first carrier rack through a first opening of the first cover plate.
Figure 30:
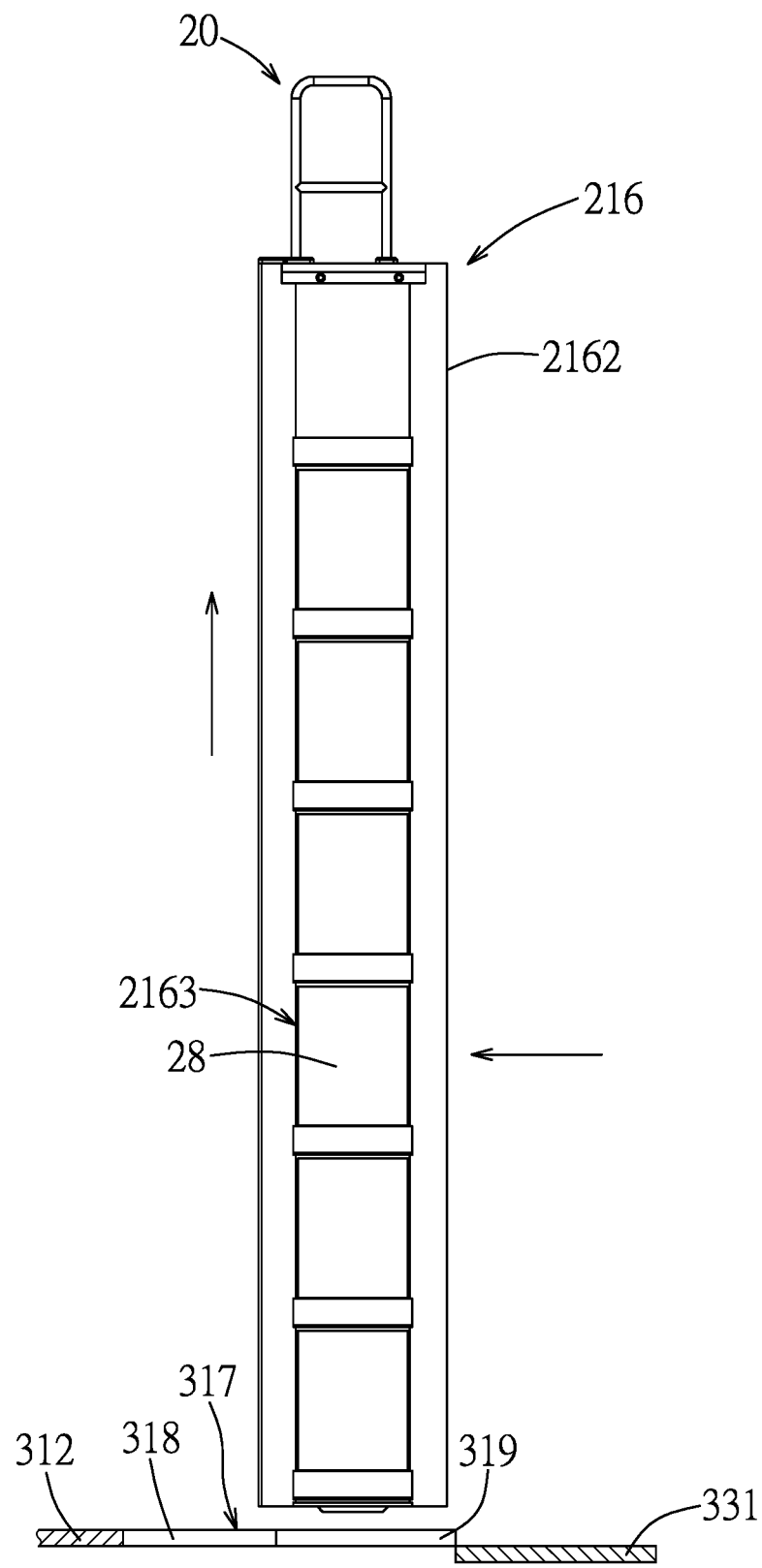
FIG. 30 is a view similar to FIG. 29, but illustrating the first carrier rack being moved away from a first insertion slot through the first opening.

Referring to FIGS. 28 to 30, in combination with FIG. 27, the central plate cover body 321 and the side plate cover body 322 are opened to expose the first carrier rack 216 through the central hole portion 318 and the side hole portion 319 of the first opening 317. The handle 20 is then assembled to the top end of the first carrier rack 216 through the side hole portion 319, after which the handle 20 is pulled upward to move the first carrier rack 216 out of the first insertion slot 217 through the first opening 317. Next, the storage box 28 is placed in number 5 of the receiving groove 2163 of the first carrier rack 216 through the open side 2162 thereof, after which the first carrier rack 216 is immediately inserted into the first insertion slot 217. The handle 20 is then disassembled from the top end of the first carrier rack 216 through the disassembling steps described above.

Figure 31:
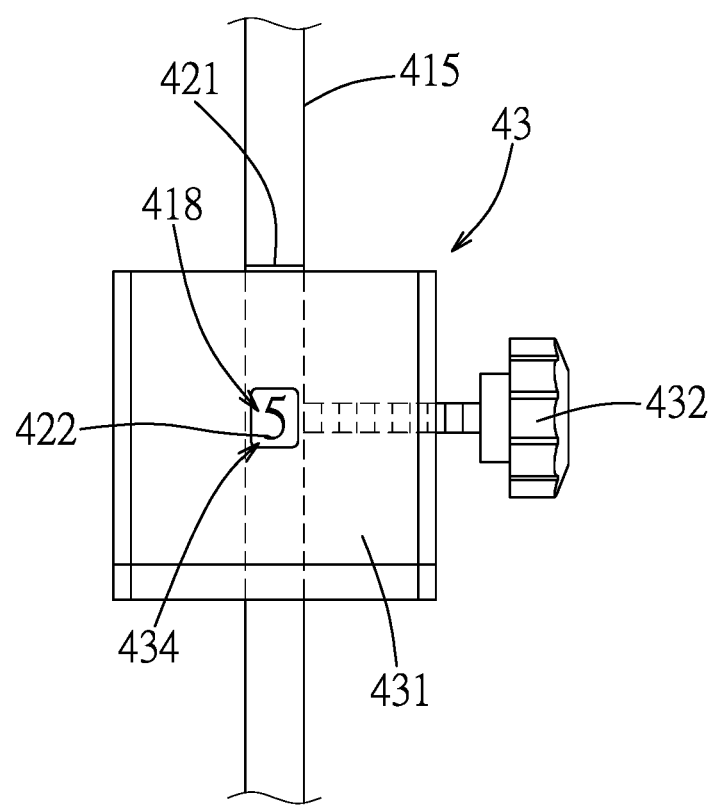
FIG. 31 is a fragmentary schematic side view of the pushing device, illustrating a top end of a positioning block being aligned with an alignment graduated line and a viewing hole being aligned with an indicator number.

Referring to FIG. 31, in combination with FIGS. 23 and 26, the fastening member 432 of the depth adjustment assembly 43 is first loosened, after which the positioning block 431 is pushed to move along the insertion tube portion 415 until the top end thereof aligns with the alignment graduated line 421 corresponding to number 5 of the indicator number 422. The positioning pin 437 is engaged to the corresponding positioning groove 419 at this time. Next, the fastening member 432 is tightened to pressingly contact the insertion tube portion 415 so as to securely position the positioning block 431 on the insertion tube portion 415. Afterwards, the user can view the number of the indicator number 422 through the viewing hole 434 to ensure that the positioning block 431 is positioned at the desired position.

Figure 32:
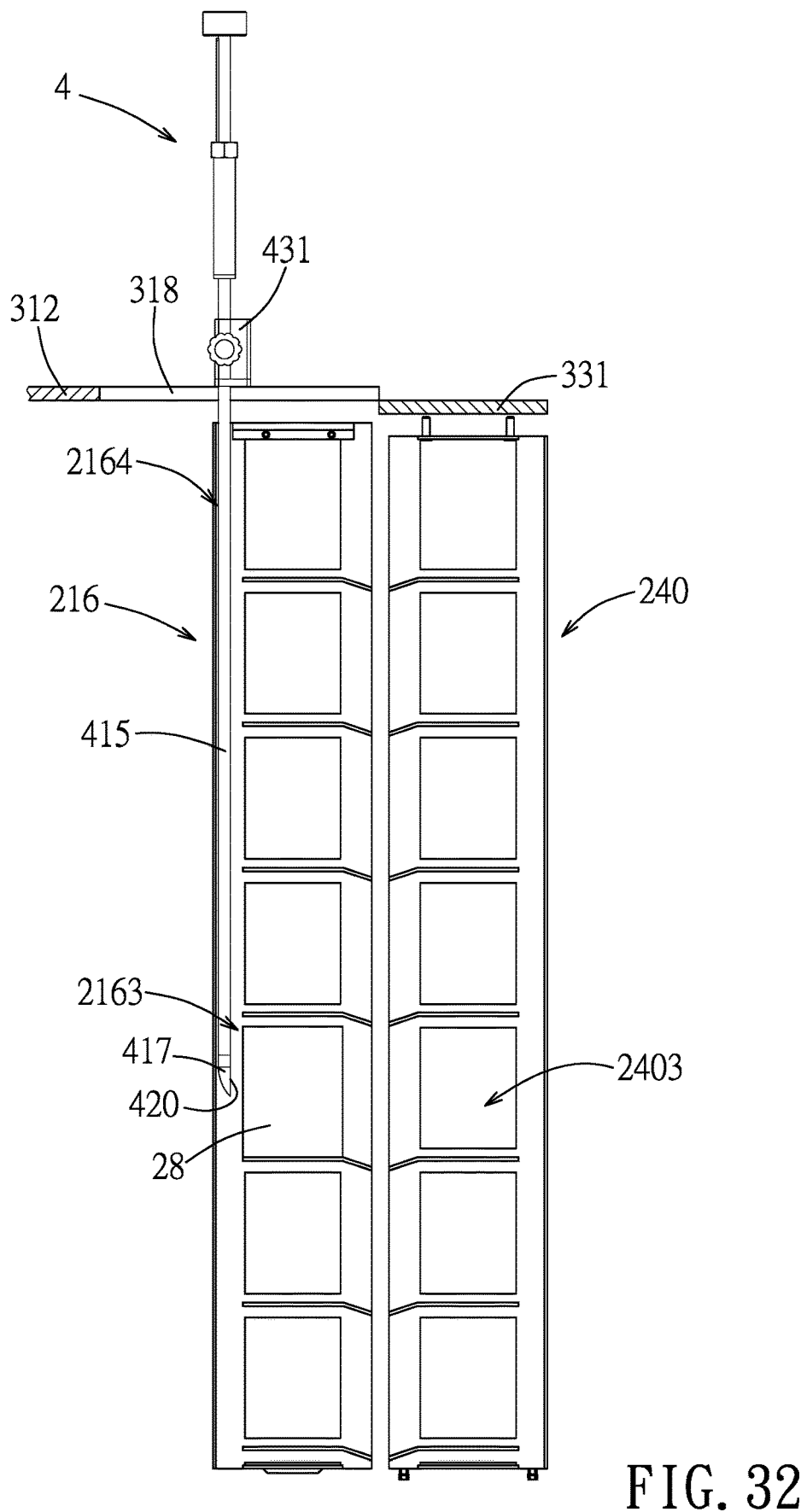
FIG. 32 is a fragmentary partly sectional view of the embodiment, illustrating an insertion tube portion of the pushing device inserted into a communication groove of the first carrier rack and the positioning block abutting against a top surface of the first cover plate.
Figure 33:
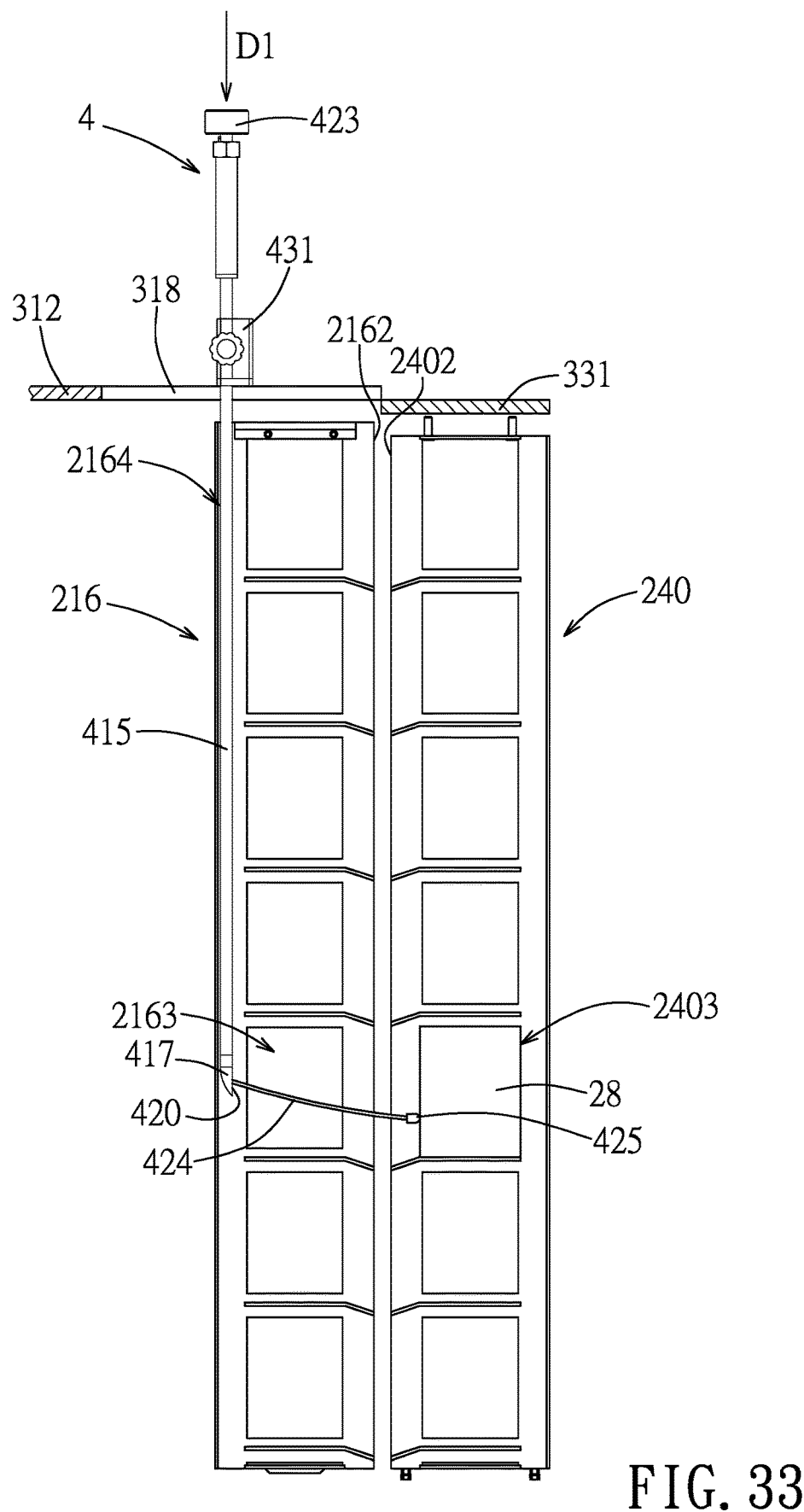
FIG. 33 is a view similar to FIG. 32, but illustrating a pressing lever being depressed so that a pushing member can push the storage box into a receiving groove of the second storage rack.

Referring to FIGS. 32 and 33, in combination with FIG. 24, the insertion tube portion 415 is then inserted into the communication groove 2164 of the first carrier rack 216 through the central hole portion 318 of the first cover plate 312 until the positioning block 431 abuts against the top end of the first cover plate 312. At this moment, the side opening 420 of the guide tube portion 417 faces the storage box 28 stored in the number 5 of the receiving groove 2163. Next, the pressing lever 423 is pressed downward in the direction of an arrow (D1) to push the spring 424 and the pushing member 425 to move downward and protrude out of the side opening 420 into the receiving groove 2163. The return spring 412 is compressed by the pressing lever 423 to store a restoring force at this time. The pushing member 425 pushes the storage box 28 to move from the receiving groove 2163 to the number 5 of the receiving groove 2403 of the second storage rack 240 through the open side 2402 thereof.

The pressing lever 423 is released after being pushed to the bottom. Through the restoring force of the return spring 412, the push rod unit 411 is automatically restored to its initial position, as shown in FIG. 24. Thereafter, the pushing device 4 is pulled upward to move the insertion tube portion 415 out of the communication groove 2164 of the first carrier rack 216 and the central hole portion 318. Next, as shown in FIG. 27, the central plate cover body 321 and the side plate cover body 322 are covered to the first cover plate 312 to respectively close the central hole portion 318 and the side hole portion 319. Thus, the storage operation of the storage box 28 is completed.

On the other hand, when the user desires to take out the storage box 28 stored in the number 5 of the receiving groove 2403 of the number 52 of the second storage rack 240 of the second storage assembly 24, the operation thereof is described below.

Figure 34:
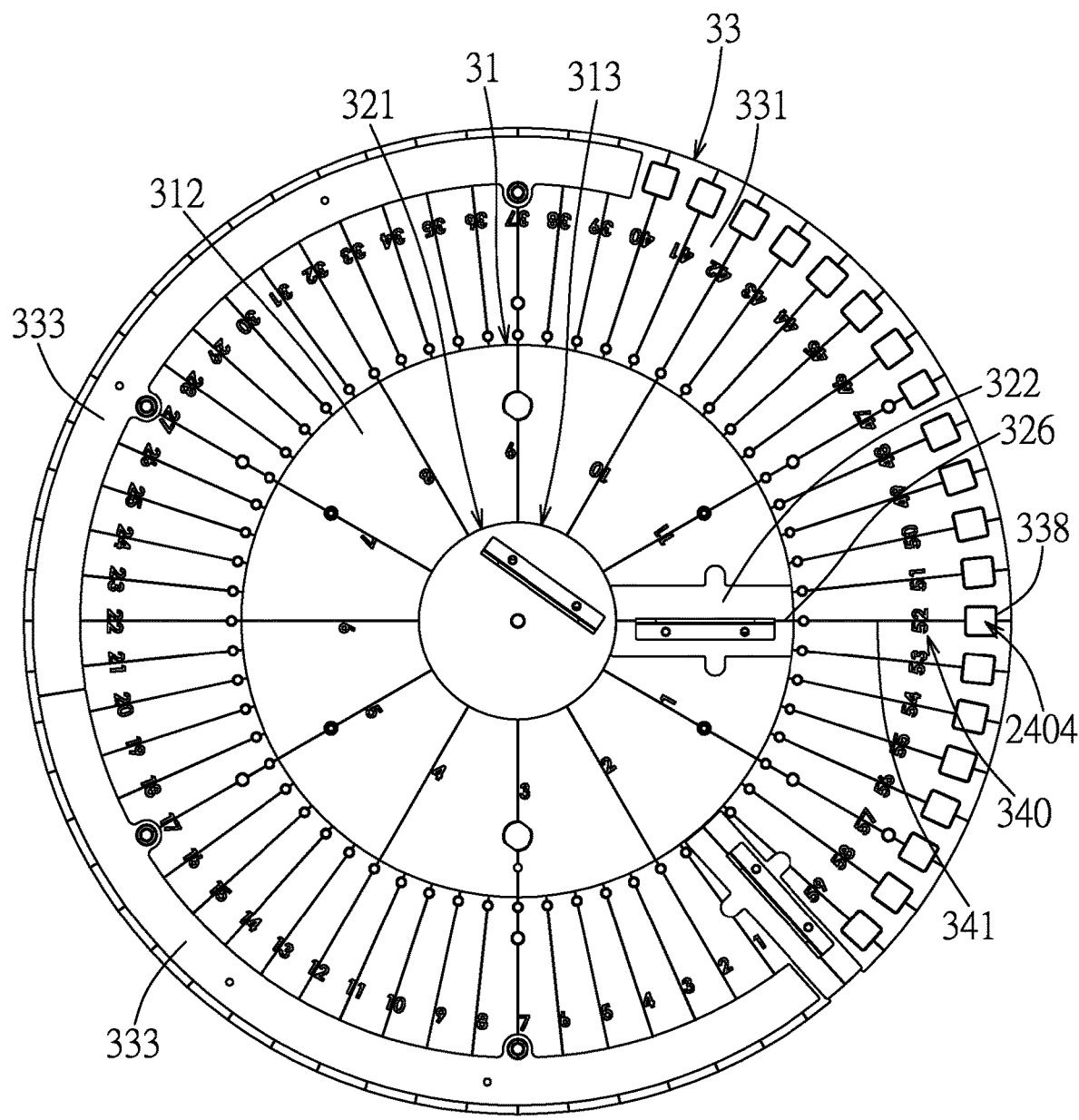
FIG. 34 is a view similar to FIG. 27, but illustrating one of first curved plates being removed to expose a communication groove of the second storage rack.
Figure 35:
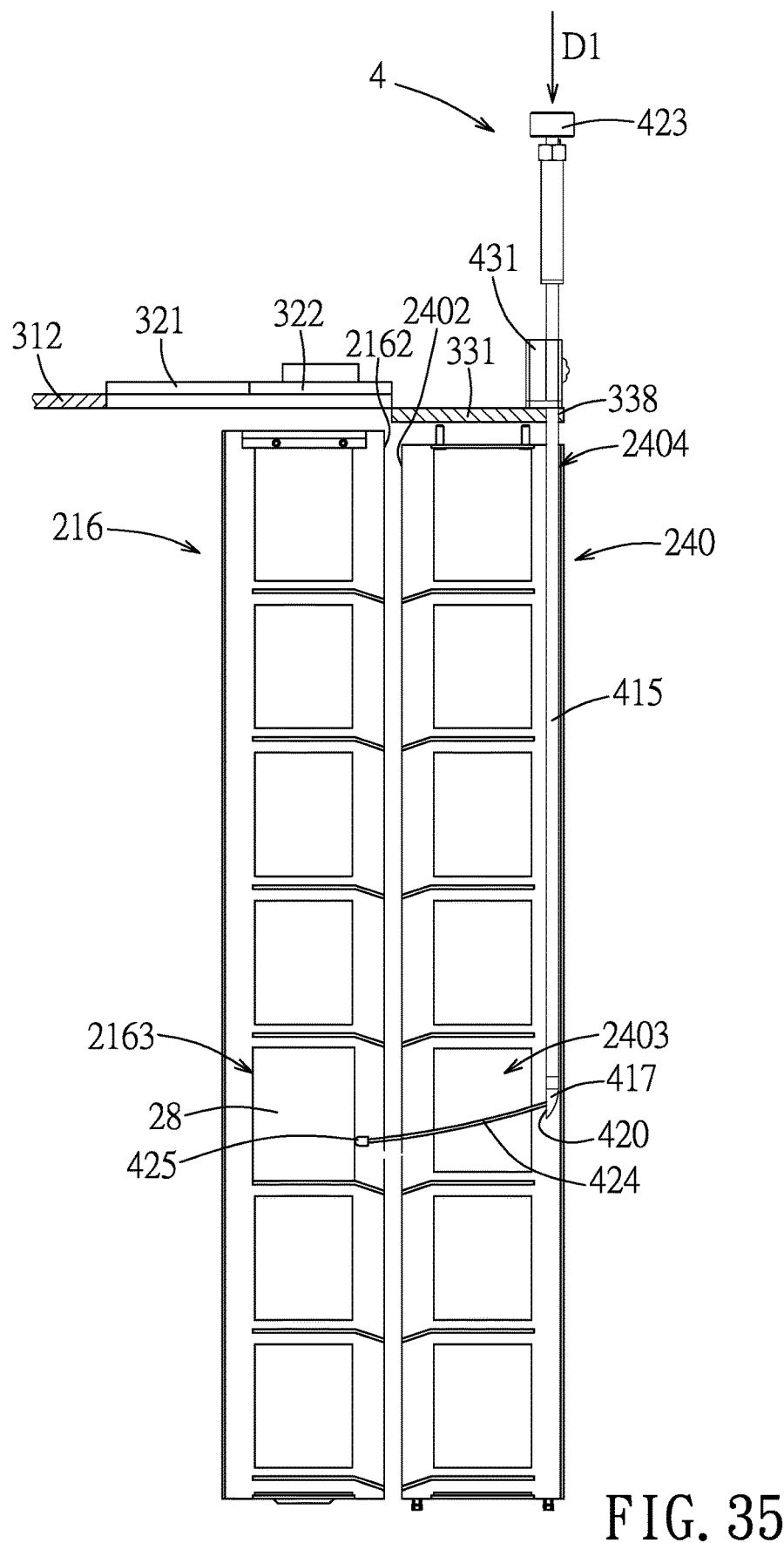
FIG. 35 is a fragmentary partly sectional view of the embodiment, illustrating the pressing lever being depressed so that the pushing member can push the storage box into a receiving groove of a first storage rack.

Referring to FIGS. 34 and 35, in combination with FIG. 27, the first protective cover assembly 31 is rotated until the first alignment mark 326 of the side plate cover body 322 is aligned with the second graduated line 341 corresponding to the number 52 of the second indicator number 340 of the second cover plate 331, after which the first curved plate 333 corresponding to the second graduated line 341 is opened, so that the communication groove 2404 of the number 52 of the second storage rack 240 is exposed through the corresponding first through slot 338.

The positioning block 431 is then adjusted to the desired position according to the method described above, and the insertion tube portion 415 is inserted into the communication groove 2404 of the second storage rack 240 through the first through slot 338 of the second cover plate 331 until the positioning block 431 abuts against the top end of the second cover plate 331. The side opening 420 of the guide tube portion 417 faces the storage box 28 in the number 5 of the receiving groove 2403 at this time. Next, the pushing device 4 is operated as described above, so that the storage box 28 is pushed from the receiving groove 2403 of the second storage rack 240 to the corresponding receiving groove 2163 of the first carrier rack 216. Thereafter, the central and side plate cover bodies 321, 322 are opened, so that the handle 20 can be assembled to the top end of the first carrier rack 216 and can be pulled upward to move the first carrier rack 216 out of the first insertion slot 217 through the first opening 317. Hence, the storage box 28 in the receiving groove 2163 of the first carrier rack 216 can be removed therefrom.

With the first, second, third and fourth protective cover assemblies 31, 33, 35, 37 of the protective cover device 3 respectively covering the top ends of the first, second, third and fourth storage assemblies 21, 24, 26, 27 of the storage device 2, when the storage or removal of the storage box 28 in any of the storage assemblies 21, 24, 26 and 27 is desired, the closure plate 313, 332, 352, 372 or the curved plate 333, 353, 373 of the protective cover device 3 corresponding to the top end of the storage assembly 21, 24, 26, 27 is only opened, so that storage or removal of the storage box 28 by the pushing device 4 can be conducted. As such, exposure of the other communication grooves of the carrier rack or the storage rack can be reduced, so that the volatilization of the liquid nitrogen and the ice particles dropping into the storage device 2 can also be reduced.

It is worth to mention herein that, although four storage assemblies of the storage device 2 and four protective cover assemblies of the protective cover device 3 are exemplified in this embodiment, in other embodiments, the storage device 2 may only include the first and second storage assemblies 21, 23, and the protective cover device 3 may only include the first and second protective cover assemblies 31, 33. Hence, the structure of each of the storage device 2 and the protective cover device 3 is not limited to what is disclosed herein. Further, although in this embodiment, each of the first, second, third and fourth storage assemblies 21, 24, 26 and 27 has the first, second, third and fourth carrier racks 216, 245, 266, 274, and each of the first, second, third and fourth protective cover assemblies 31, 33, 35, 37 has the first, second, third and fourth closure plates 313, 332, 352, 372, in other embodiments, only one of the first and second storage assemblies 21, 24 may have the carrier rack, only one of the first and second protective cover assemblies 31, 33 may have the closure plate corresponding to the carrier rack, only one of the third and fourth storage assemblies 26, 27 may have the carrier rack, and only one of the third and fourth protective cover assemblies 35, 37 may have the closure plate corresponding to the carrier rack. Hence, the structure of each storage assembly and each protective cover assembly is not limited to what is disclosed herein. Moreover, although in this embodiment, the first storage assembly 21 is exemplified as being rotatable relative to the second storage assembly 23, and the third storage assembly 26 is exemplified as being rotatable relative to the fourth storage assembly 27, in other embodiments, the second storage assembly 23 may be configured as being rotatable relative to the first storage assembly 21, and the fourth storage assembly 27 may be configured as being rotatable relative to the third storage assembly 26.

In sum, with the protective cover device 3 being provided to cover the top end of the storage device 2, the storage apparatus 100 of this disclosure can prevent rapid volatilization of the liquid nitrogen which can lead to generation of fog and reduce visibility, and can prevent ice particles from dropping into the storage barrel 1. As such, safety in use can be ensured and the problem of accumulation of ice particles in the storage barrel 1 can be resolved. Moreover, through the colors of the first, second, third and fourth cover plates 312, 331, 351, 371, through the first, second, third and fourth indicator marks 323, 339, 359, 378, and through the first, second, third and fourth alignment marks 326, 342, 362, 381 of the first, second, third and fourth closure plates 313, 332, 352, 372, the user can conveniently, quickly and accurately align the carrier rack and the corresponding storage rack. Through this, the speed and efficiency of storing and removing the storage box 28 can be enhanced. Therefore, the object of this disclosure can be realized.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the most practical embodiment, it is understood that this disclosure is not limited to the disclosed embodiment but is desired to cover various arrangements included within the spirit and scope of the broadest interpretation so as to encompass all such modifications and equivalent arrangements.

What is claimed is:

1. A storage apparatus comprising:

a storage device including first and second storage assemblies, said first storage assembly including a plurality of first storage racks arranged in a ring shape, and a plurality of suspension units each of which includes at least one roller, said second storage assembly including a plurality of second storage racks surrounding said first storage racks, said at least one roller of each of said suspension units being rollable along said second storage assembly, said first storage assembly being suspended on said second storage assembly through said suspension units, and being rotatable relative to said second storage assembly through said at least one roller of each of said suspension units, at least one of said first and second storage assemblies including a removable carrier rack, said carrier rack cooperating with said first storage racks or said second storage racks to form a cylinder having a circular-shaped periphery, said carrier rack being moved to align with a selected one of said first storage racks or said second storage racks when said first storage assembly is rotated relative to said second storage assembly; and a protective cover device covering said storage device and including a first protective cover assembly disposed on a top end of said first storage assembly, and a second protective cover assembly disposed on a top end of said second storage assembly and surrounding said first protective cover assembly, at least one of said first and second protective cover assemblies, including a cover plate and a closure plate, said cover plate covering said first storage racks or said second storage racks and being formed with a central opening corresponding to the top of said carrier rack, said closure plate being openably connected to said cover plate for closing said central opening, said closure plate configured to be detached from said cover plate to permit removal of said carrier rack through said central opening.

2. The storage apparatus as claimed in claim 1, wherein said first storage assembly includes said carrier rack, said carrier rack of said first storage assembly being designated as a first carrier rack configured to align with a selected one of said second storage racks, said first protective cover assembly including a first closure plate aligned with said first carrier rack and being openable, said first closure plate having a first alignment mark, said second protective cover assembly including a plurality of indicator marks respectively aligned with the locations of said second storage racks, said first alignment mark being configured to align with a selected one of said indicator marks.

3. The storage apparatus as claimed in claim 1, wherein said second storage assembly includes said carrier rack, said carrier rack of said second storage assembly being configured to align with a selected one of said first storage racks, said second protective cover assembly including a closure plate aligned with said carrier rack of said second storage assembly and being openable, said closure plate of said second protective cover assembly having an alignment mark, said first protective cover assembly including a plurality of indicator marks respectively aligned with the locations of said first storage racks, said alignment mark of said closure plate of said second protective cover assembly being configured to align with a selected one of said indicator marks of said first protective cover assembly.

4. The storage apparatus as claimed in claim 2, wherein said second storage assembly includes said carrier rack, said carrier rack of said second storage assembly being designated as a second carrier rack configured to align with a selected one of said first storage racks, said second protective cover assembly including a second closure plate aligned with said second carrier rack and being openable, said second closure plate having a second alignment mark, said first protective cover assembly including a plurality of first indicator marks respectively aligned with the locations of said first storage racks, said second alignment mark being configured to align with a selected one of said first indicator marks, each of said indicator marks of said second storage assembly being designated as a second indicator mark.

5. The storage apparatus as claimed in claim 4, wherein said first protective cover assembly further includes a first cover plate covering said first storage racks and formed with a first opening registered with said first carrier rack, said first closure plate being openably connected to said first cover plate to close said first opening, said second protective cover assembly further including a second cover plate covering said second storage racks and formed with a second opening registered with said second carrier rack, said second closure plate being openably connected to said second cover plate to close said second opening.

6. The storage apparatus as claimed in claim 5, wherein said first cover plate is disposed higher than said second cover plate and has an outer circumferential edge, said second cover plate having an inner circumferential edge, a portion of said first cover plate proximate said outer circumferential edge thereof abutting with the top of a portion of said second cover plate proximate said inner circumferential edge thereof.

7. The storage apparatus as claimed in claim 5, wherein said first cover plate has a first color, said second cover plate having a second color different from the first color, each of said first indicator marks including a first graduated line engraved on said first cover plate for alignment with said second alignment mark, and a first indicator number engraved on said first cover plate and proximate to said first graduated line, each of said second indicator marks including a second graduated line engraved on said second cover plate for alignment with said first alignment mark, and a second indicator number engraved on said second cover plate and proximate to said second graduated line.

8. The storage apparatus as claimed in claim 5, wherein said first opening has a central hole portion and a side hole portion communicating with said central hole portion, said first carrier rack having a communication groove aligned with said central hole portion, each of said first storage racks having a communication groove aligned with said central hole portion, said first carrier rack having a part aligned with said side hole portion, said first closure plate including a central plate cover body for closing said central hole portion, and a side plate cover body for closing said side hole portion, said second cover plate being formed with a plurality of first through slots annularly spaced apart from each other, each of said second storage racks being formed with a communication groove aligned with a corresponding one of said first through slots, said second protective cover assembly further including a plurality of first curved plates arranged in a ring shape and openably connected to said second cover plate for closing said first through slots.

9. The storage apparatus as claimed in claim 1, wherein said storage device further includes third and fourth storage assemblies, said third storage assembly including a plurality of third storage racks arranged in a ring shape and surrounding said second storage racks, said fourth storage assembly including a plurality of fourth storage racks arranged in a ring shape and surrounding said third storage racks, one of said third and fourth storage assemblies being rotatable relative to the other, at least one of said third and fourth storage assemblies including another removable carrier rack configured to align with a selected one of said storage racks of the other one of said third and fourth storage assemblies, said protective cover device further including a third protective cover assembly disposed on a top end of said third storage assembly and surrounding said second protective cover assembly, and a fourth protective cover assembly disposed on a top end of said fourth storage assembly and surrounding said third protective cover assembly, at least one of said third and fourth protective cover assemblies being openable at an area corresponding to the top of said another carrier rack to permit removal of the same.

10. The storage apparatus as claimed in claim 9, wherein said third storage assembly includes said another carrier rack, said another carrier rack of said third storage assembly being designated as a third carrier rack configured to align with a selected one of said fourth storage racks, said third protective cover assembly including a third closure plate aligned with said third carrier rack and being openable, said third closure plate including a third alignment mark, said fourth protective cover assembly including a plurality of indicator marks respectively aligned with the locations of said fourth storage racks, said third alignment mark being configured to align with a selected one of said indicator marks of said fourth protective cover assembly.

11. The storage apparatus as claimed in claim 10, wherein said fourth storage assembly includes a fourth carrier rack configured to align with a selected one of said third storage racks, said fourth protective cover assembly including a fourth closure plate aligned with said fourth carrier rack and being openable, said fourth closure plate including a fourth alignment mark, said third protective cover assembly including a plurality of third indicator marks respectively aligned with the locations of said third storage racks, said fourth alignment mark being configured to align with a selected one of said third indicator marks, each of said indicator marks of said fourth storage assembly being designated as a fourth indicator mark.

12. The storage apparatus as claimed in claim 11, wherein said third protective cover assembly further includes a third cover plate covering said third storage racks and formed with a third opening registered with said third carrier rack, said third closure plate being openably connected to said third cover plate for closing said third opening, said fourth protective cover assembly further including a fourth cover plate covering said fourth storage racks and formed with a fourth opening registered with said fourth carrier rack, said fourth closure plate being openably connected to said fourth cover plate for closing said fourth opening.

13. The storage apparatus as claimed in claim 12, wherein said third cover plate is disposed higher than said fourth cover plate, said third cover plate having an outer circumferential edge, said fourth cover plate having an inner circumferential edge, a portion of said third cover plate proximate said outer circumferential edge thereof abutting with the top of a portion of said fourth cover plate proximate said inner circumferential edge thereof.

14. The storage apparatus as claimed in claim 12, wherein said third cover plate has a third color, said fourth cover plate having a fourth color different from the third color, each of said third indicator marks including a third graduated line engraved on said third cover plate for alignment with said fourth alignment mark, and a third indicator number engraved on said third cover plate and proximate to said third graduated line, each of said fourth indicator marks including a fourth graduated line engraved on said fourth cover plate for alignment with said third alignment mark, and a fourth indicator number engraved on said fourth cover plate and proximate to said fourth graduated line.

15. The storage apparatus as claimed in claim 12, wherein said third cover plate is formed with a plurality of second through slots annularly spaced apart from each other, each of said third storage racks being formed with a communication groove aligned with a corresponding one of said second through slots, said third protective cover assembly further including a plurality of second curved plates arranged in a ring shape and openably connected to said third cover plate for closing said second through slots, each of said fourth storage racks being formed with a communication groove exposed from an outer periphery of said fourth cover plate, said fourth protective cover assembly further including a plurality of third curved plates arranged in a ring shape and openably connected to the outer periphery of said fourth cover plate for closing said communication grooves of said fourth storage racks.

16. The storage apparatus as claimed in claim 9, wherein said first protective cover assembly is disposed higher than said second protective cover assembly, said third protective cover assembly being disposed higher than said second and fourth protective cover assemblies, each of said first, second and third protective cover assemblies including an outer circumferential edge, each of said second, third and fourth protective cover assemblies including an inner circumferential edge, a portion of said first protective cover assembly proximate said outer circumferential edge thereof abutting with the top of a portion of said second protective cover assembly proximate said inner circumferential edge thereof, a portion of said third protective cover assembly proximate said inner circumferential edge thereof abutting with the top of a portion of said second protective cover assembly proximate said outer circumferential edge thereof, a portion of said third protective cover assembly proximate said outer circumferential edge thereof abutting with the top of a portion of said fourth protective cover assembly proximate said inner circumferential edge thereof.

17. The storage apparatus as claimed in claim 1, wherein said storage device further includes a plurality of storage boxes, said carrier rack including a plurality of receiving grooves spaced apart from each other along the length of said carrier rack, and a communication groove communicating with said receiving grooves, each of said storage boxes being movably received in a corresponding one of said receiving grooves, said storage apparatus further comprising a pushing device, said pushing device including a push rod assembly configured to be inserted into said communication groove, and a depth adjustment assembly for adjusting a depth of said push rod assembly in said communication groove, said push rod assembly being capable of pushing a storage box disposed at a selected position of said carrier rack into a corresponding one of said storage racks.

18. The storage apparatus as claimed in claim 17, wherein said push rod assembly includes a tube member having a side surface engraved with a plurality of depth indicator marks that are spaced apart from each other in a top-bottom direction, said depth adjustment assembly including a positioning block sleeved on said tube member and slidable along the length of said tube member, and a fastening member threadedly connected to said positioning block, said positioning block being configured to abut against a top end of one of said first and second protective cover assemblies and to align with a selected one of said depth indicator marks, said fastening member being operable to pressingly contact said tube member for positioning said positioning block on said tube member.

19. The storage apparatus as claimed in claim 18, wherein each of said depth indicator marks includes an alignment graduated line, and an indicator number proximate to the bottom of said alignment graduated line, a top end of said positioning block being configured to align with said alignment graduated line, and being formed with a viewing hole for exposure of said indicator number.

20. The storage apparatus as claimed in claim 19, wherein said tube member further has another side surface formed with a plurality of positioning grooves opposite to said depth indicator marks and spaced apart from each other in the top-bottom direction, said positioning grooves respectively corresponding in position to said depth indicator marks, said depth adjustment assembly further including a positioning pin disposed in said positioning block for engaging a corresponding one of said positioning grooves, and a biasing spring for biasing said positioning pin toward said tube member.

21. The storage apparatus as claimed in claim 18, wherein said push rod assembly further includes a push rod unit inserted into said tube member for pushing said storage box disposed at the selected position of said carrier rack when depressed, and a return spring disposed in said tube member and providing restoring force for said push rod unit.

22. The storage apparatus as claimed in claim 21, wherein said tube member is formed with a limiting guide groove, said push rod unit including an elongated protrusion inserted into said limiting guide groove, said limiting guide groove being configured to prevent rotation of said push rod unit relative to said tube member.

23. The storage apparatus as claimed in claim 17, wherein said storage device further includes a handle removably connected to a top end of said carrier rack.

24. The storage apparatus as claimed in claim 23, wherein said handle includes a shielding plate for covering said communication groove.

25. The storage apparatus as claimed in claim 24, wherein said carrier rack is formed with an engaging groove, said engaging groove having a groove portion, a first opening communicating with said groove portion, and a second opening communicating with said groove portion and said first opening, said second opening having a width smaller than that of said first opening, said handle further including an engaging member, said engaging member being extendable into said groove portion through said first opening and being engaged to said groove portion by moving from said first opening to said second opening, said shielding plate being formed on one side of said engaging member.

26. The storage apparatus as claimed in claim 25, wherein said carrier rack includes a first magnet aligned with said second opening, said handle further including a second magnet disposed on a bottom end of said engaging member for magnetically attracting said first magnet.

27. The storage apparatus as claimed in claim 1, wherein said storage device further includes a plurality of storage boxes respectively disposed on each of said first storage racks and said carrier rack, each of said storage boxes including a shell and a cover connected to said shell, said shell including a shell plate that has a plurality of spaced-apart first elongated ribs, said cover including a cover plate that has a plurality of spaced-apart second elongated ribs.

28. The storage apparatus as claimed in claim 27, wherein said shell plate has an inner surface, said first elongated ribs protruding inward from said inner surface, said cover plate having an outer surface, said second elongated ribs protruding outward from said outer surface, said shell further including a bottom plate formed on a bottom end of said shell plate, two side plates formed on left and right sides of said shell plate, said bottom plate having a lower stop plate portion spaced apart from said inner surface for stopping said outer surface of said cover plate, each of said side plates having a side stop plate portion spaced apart from said inner surface of said shell plate for stopping said outer surface of said cover plate.

29. A protective cover device for covering a storage device of a storage apparatus, comprising:
a first protective cover assembly; and
a second protective cover assembly surrounding said first protective cover assembly, said first protective cover assembly including a cover plate and an openable first closure plate, said cover plate being formed with a central opening, said openable first closure plate being openably connected to said cover plate for closing said central opening, and being configured to be detached from said cover plate,
wherein said openable first closure plate has a first alignment mark, said second protective cover assembly including a plurality of indicator marks arranged in a ring shape, said first alignment mark being configured to align with a selected one of said indicator marks.

30. The protective cover device as claimed in claim 29, wherein said second protective cover assembly further includes an openable second closure plate, said second closure plate having a second alignment mark, said first protective cover assembly including a plurality of first indicator marks arranged in a ring shape, said second alignment mark being configured to align with a selected one of said first indicator marks, each of said indicator marks of said second protective cover assembly being designated as a second indicator mark.

31. The protective cover device as claimed in claim 30, wherein said first protective cover assembly further includes a first cover plate, said first cover plate being formed with a first opening, said first closure plate being openably connected to said first cover plate for closing said first opening, said second protective cover assembly further including a second cover plate, said second cover plate being formed with a second opening, said second closure plate being openably connected to said second cover plate for closing said second opening.

32. The protective cover device as claimed in claim 31, wherein said first cover plate has a first color, said second cover plate having a second color different from the first color, each of said first indicator marks including a first graduated line engraved on said first cover plate for alignment with said second alignment mark, and a first indicator number engraved on said first cover plate and proximate to said first graduated line, each of said second indicator marks including a second graduated line engraved on said second cover plate for alignment with said first alignment mark, and a second indicator number engraved on said second cover plate and proximate to said second graduated line.

33. The protective cover device as claimed in claim 31, wherein said first opening has a central hole portion and a side hole portion communicating with said central hole portion, said first closure plate including a central plate cover body for closing said central hole portion, and a side plate cover body for closing said side hole portion, said second cover plate being formed with a plurality of first through slots arranged in a ring shape, said second protective cover assembly further including a plurality of first curved plates arranged in a ring shape and openably connected to said second cover plate, said first curved plates being configured to close said first through holes.

34. The protective cover device as claimed in claim 31, wherein said storage protective cover device further includes a third protective cover assembly surrounding said second protective cover assembly, and a fourth protective cover assembly surrounding said third protective cover assembly, said third protective cover assembly including an openable third closure plate, and a plurality of third indicator marks arranged in a ring shape, said third protective closure plate including a third alignment mark, said fourth protective cover assembly including an openable fourth closure plate, and a plurality of fourth indicator marks arranged in a ring shape, said third alignment mark being configured to align with a selected one of said fourth indicator marks, said fourth alignment mark being configured to align with a selected one of said third indicator marks.

35. The protective cover device as claimed in claim 34, wherein said third protective cover assembly further includes a third cover plate, said third cover plate being formed with a third opening, said third closure plate being openably connected to said third cover plate for closing said third opening, said fourth protective cover assembly further including a fourth cover plate formed with a fourth opening, said fourth closure plate being openably connected to said fourth cover plate for closing said fourth opening.

36. The protective cover device as claimed in claim 35, wherein said third cover plate has a third color, said fourth cover plate having a fourth color different from the third color, each of said third indicator marks including a third graduated line engraved on said third cover plate for alignment with said fourth alignment mark, and a third indicator number engraved on said third cover plate and proximate to said third graduated line, each of said fourth indicator marks including a fourth graduated line engraved on said fourth cover plate for alignment with said third alignment mark, and a fourth indicator number engraved on said fourth cover plate and proximate to said fourth graduated line.

37. The protective cover device as claimed in claim 35, wherein said third cover plate is formed with a plurality of second through slots arranged in a ring shape, said third protective cover assembly further including a plurality of second curved plates arranged in a ring shape and openably connected to said third cover plate, said second curved plates being configured to close said second through slots, said fourth protective cover assembly further including a plurality of third curved plates arranged in a ring shape and openably connected to an outer periphery of said fourth cover plate.

38. The protective cover device as claimed in claim 35, wherein said first cover plate is disposed higher than said second cover plate, said third cover plate being disposed higher than said second and fourth cover plates, each of said first, second and third cover plates including an outer circumferential edge, each of said second, third and fourth cover plates including an inner circumferential edge, a portion of said first cover plate proximate said outer circumferential edge thereof abutting with the top of a portion of said second cover plate proximate said inner circumferential edge thereof, a portion of said third cover plate proximate said inner circumferential edge thereof abutting with the top of a portion of said second cover plate proximate said outer circumferential edge thereof, a portion of said third cover plate proximate said outer circumferential edge thereof abutting with the top of a portion of said fourth cover plate proximate said inner circumferential edge thereof.

* * * * *